United States Patent
Francois et al.

(10) Patent No.: US 12,301,880 B2
(45) Date of Patent: May 13, 2025

(54) METHOD AND DEVICE FOR LUMA MAPPING WITH CROSS COMPONENT SCALING

(71) Applicant: InterDigital CE Patent Holdings, SAS, Paris (FR)

(72) Inventors: Edouard Francois, Bourg des Comptes (FR); Philippe Bordes, Laille (FR); Pierre Andrivon, Liffre (FR); Philippe De Lagrange, Betton (FR); Gaëlle Martin-Cocher, Toronto (CA); Srinivas Gudumasu, Montreal (CA)

(73) Assignee: InterDigital CE Patent Holdings, SAS, Paris (FR)

( * ) Notice: Subject to any disclaimer, the term of this patent is extended or adjusted under 35 U.S.C. 154(b) by 42 days.

(21) Appl. No.: 18/269,506

(22) PCT Filed: Dec. 3, 2021

(86) PCT No.: PCT/EP2021/084102
§ 371 (c)(1),
(2) Date: Jun. 23, 2023

(87) PCT Pub. No.: WO2022/135876
PCT Pub. Date: Jun. 30, 2022

(65) Prior Publication Data
US 2024/0080484 A1    Mar. 7, 2024

(30) Foreign Application Priority Data

Dec. 23, 2020    (EP) .................................... 20306679

(51) Int. Cl.
*H04N 7/12*       (2006.01)
*H04N 19/186*     (2014.01)
(Continued)

(52) U.S. Cl.
CPC ........... *H04N 19/70* (2014.11); *H04N 19/186* (2014.11); *H04N 19/12* (2014.11)

(58) Field of Classification Search
CPC ..................................................... H04N 19/12
See application file for complete search history.

(56) References Cited

U.S. PATENT DOCUMENTS 5,642,137 A    6/1997  Kitazumi
7,573,620 B2   8/2009  Presley et al.
(Continued)

FOREIGN PATENT DOCUMENTS

AU    2014292249 B2    11/2018
CN       1640144 A      7/2005
(Continued)

OTHER PUBLICATIONS

Matsuo et al., "AHG7: Modification of in-loop colour-space transformation", Joint Collaborative Team on Video Coding (JCT-VC) of ITU-T SG 16 WP 3 and ISO/IEC JTC 1/SC 29/WG 11, Document: JCTVC-M0072, 13th Meeting: Incheon, Korea, Apr. 18, 2013, 11 pages.

(Continued)

*Primary Examiner* — Y Lee
(74) *Attorney, Agent, or Firm* — Condo Roccia Koptiw LLP

(57) ABSTRACT

A method comprising: obtaining (601) a syntax element associated with video data, wherein said syntax element specifies that a cross-color component transform process in which at least one second color component is transformed based on at least one first color component different from the second color component is to be applied to the video data as a post processing process following a decoding process to be applied to the video data.

20 Claims, 10 Drawing Sheets

(51) Int. Cl.
*H04N 19/70* (2014.01)
*H04N 19/12* (2014.01)

(56) References Cited

U.S. PATENT DOCUMENTS

| | | |
|---|---|---|
| 8,248,486 B1 | 8/2012 | Ward et al. |
| 2001/0036320 A1 | 11/2001 | Tan et al. |
| 2003/0112454 A1 | 6/2003 | Woolfe et al. |
| 2005/0105613 A1 | 5/2005 | Marquant et al. |
| 2005/0141617 A1 | 6/2005 | Kim et al. |
| 2008/0253445 A1 | 10/2008 | Hekstra et al. |
| 2009/0052539 A1 | 2/2009 | Yu |
| 2009/0141810 A1 | 6/2009 | Tabatabai et al. |
| 2009/0174726 A1 | 7/2009 | Ollivier |
| 2010/0208989 A1 | 8/2010 | Narroschke et al. |
| 2010/0266042 A1 | 10/2010 | Koo et al. |
| 2013/0121415 A1 | 5/2013 | Wahadaniah et al. |
| 2013/0241931 A1 | 9/2013 | Mai et al. |
| 2014/0003487 A1 | 1/2014 | Haque et al. |
| 2014/0049603 A1 | 2/2014 | Wang et al. |
| 2014/0086331 A1 | 3/2014 | Wang |
| 2014/0241418 A1 | 8/2014 | Garbas et al. |
| 2014/0307785 A1 | 10/2014 | Topiwala et al. |
| 2014/0355689 A1 | 12/2014 | Tourapis |
| 2014/0355897 A1 | 12/2014 | Tourapis |
| 2014/0376611 A1 | 12/2014 | Kim et al. |
| 2015/0201179 A1 | 7/2015 | Bouazizi et al. |
| 2018/0035015 A1 | 2/2018 | Bordes et al. |

FOREIGN PATENT DOCUMENTS

| | | |
|---|---|---|
| CN | 101189875 A | 5/2008 |
| CN | 101889447 A | 11/2010 |
| KR | 20090014287 A | 2/2009 |
| KR | 102332904 B1 | 11/2021 |
| RU | 2413383 C2 | 2/2011 |
| WO | WO 2010128962 A1 | 11/2010 |
| WO | WO 2013068132 A1 | 5/2013 |
| WO | WO 2013103522 A1 | 7/2013 |
| WO | WO 2014008170 A1 | 1/2014 |
| WO | WO 2014166705 A1 | 10/2014 |
| WO | WO 2014193538 A1 | 12/2014 |
| WO | WO 2014205363 A1 | 12/2014 |
| WO | WO 2015007599 A1 | 1/2015 |

OTHER PUBLICATIONS

Kawamura et al., "AHG7: In-Loop Color-Space Transformation of Residual Signals for Range Extensions", Joint Collaborative Team on Video Coding (JCT-VC) of ITU-T SG 16 WP 3 and ISO/IEC JTC 1/SC 29/WG 11, Document: JCTVC-L0371, 12th Meeting, Geneva, Switzerland, Jan. 14, 2013, 4 pages.

Matsumura et al., "AHG7: Post filter for colour-space transformation", Joint Collaborative Team on Video Coding (JCT-VC) of ITU-T SG 16 WP 3 and ISO/IEC JTC 1/SC 29/WG 11, Document: JCTVC-M0080, 13th Meeting, Incheon, Korea, Apr. 18, 2013, 11 pages.

Lu et al., "Adaptive reshaping for next generation video codec", The International Society for Optics and Photonics (SPIE), Applications of Digital Image Processing XLI, Proceedings of SPIE, vol. 10752, Sep. 19, 2018, 12 pages.

International Telecommunication Union, "Parameter Values for Ultra-High Definition Television Systems for Production and International Programme Exchange", ITU-R Radiocommunication Sector of ITU, BT Series Broadcasting Service (television), Recommendation ITU-R BT.2020, Aug. 2012, 7 pages.

Chen et al., "SHVC Draft Text 1", Joint Collaborative Team on Video Coding (JCT-VC) of ITU-T SG16 WP3 and ISO/IEC JTC1/SC29/WG11, Document: JCTVC-L1008, 12th Meeting, Geneva, Switzerland, Jan. 14, 203, 34 pages.

Chen et al., "Preliminary version of High efficiency video coding (HEVC) scalable extension Draft 6", Joint Collaborative Team on Video Coding (JCT-VC) of ITU-T SG 16 WP 3 and ISO/IEC JTC 1/SC 29/WG 11, Document: JCTVC-Q1008_v2, 17th Meeting, Valencia, Spain, Mar. 27, 2014, 160 pages.

Bordes, Phillipe, "Colour Mapping SEI message", Joint Collaborative Team on Video Coding (JCT-VC) of ITU-T SG 16 WP 3 and ISO/IEC JTC 1/SC 29/WG 11, Document: JCTVC-O0363_r1, 15th Meeting, Geneva, Switzerland, Oct. 23, 2013, 7 pages.

Minoo et al., "Description of the Exploratory Test Model (ETM) for HDR/WCG extension of HEVC", Joint Collaborative Team on Video Coding (JCT-VC) of ITU-T SG 16 WP 3 and ISO/IEC JTC 1/SC 29/WG 11, Document: JCTVC-W0092r1 m37734, 23rd Meeting, San Diego, USA, Feb. 19, 2016, 4 pages.

Bordes et al., "Color Mapping SEI message", Joint Collaborative Team on Video Coding (JCT-VC) of ITU-T SG 16 WP3 and ISO/IEC JTC 1/SC 29/WG 11, Document: JCTVC-N0180, 14th Meeting, Vienna, Austria, Jul. 25, 2013, 10 pages.

Flynn et al., "High Efficiency Video Coding (HEVC) Range Extensions text specification: Draft 3", Joint Collaborative Team on Video Coding (JCT-VC) of ITU-T SG 16 WP 3 and ISO/IEC JTC 1/SC 29/WG 11, Document: JCTVC-M1005_v1, 13th Meeting, Incheon, Korea, Apr. 18, 2013, 316 pages.

Anonymous, "Series H: Audiovisual and Multimedia Systems Infrastructure of audiovisual services—Coding of moving video; High efficiency video coding", ITU-T Telecommunication Standardization Sector of ITU, Recommendation ITU-T H.265, Oct. 2014, 540 pages.

Andrivon et al., "SEI message for Colour Mapping Information", Joint Collaborative Team on Video Coding (JCT-VC) of ITU-T SG 16 WP3 and ISO/IEC JTC 1/SC 29/WG 11, Document: JCTVC-Q0074-r3, 17th Meeting, Valencia, Spain, Mar. 27, 2014, 14 pages.

Bordes et al., "AHG14: Color Gamut Scalable Video Coding using 3D LUT", Joint Collaborative Team on Video Coding (JCT-VC) of ITU-T SG 16 WP 3 and ISO/IECJTC 1/SC 29/WG 11, Document: JCTVC-M0197-r2, 13th Meeting, Incheon, Korea, Apr. 18, 2013, 10 pages.

Mai et al., "Computationally Efficient Tone-Mapping of High-Bit-Depth Video in The YCBCR Domain", Institute of Electrical and Electronics Engineers (IEEE), 2012 IEEE International Conference on Acoustics, Speech and Signal Processing (ICASSP), Kyoto, Japan, Mar. 25, 2012, 4 pages.

International Telecommunication Union, "Studio Encoding Parameters of Digital Television for Standard 4:3 and Wide-Screen 16:9 Aspect Ratios", ITU-R Radiocommunication Sector of ITU, BT Series Broadcasting Service (television), Recommendation ITU-R BT.601-7, Mar. 2011, 20 pages.

Suzuki et al., "HEVC conformance test development (AHG5)", Joint Collaborative Team on Video Coding (JCT-VC) of ITU-T SG 16 WP 3 and ISO/IEC JTC 1/SC 29/WG 11, Document: JCTVC-L0005, 12th Meeting, Geneva, Switzerland, Jan. 14, 2013, 9 pages.

International Telecommunication Union, "Parameter Values for The HDTV Standards for Production and International Programme Exchange", ITU-R Radiocommunication Sector of ITU, BT Series Broadcasting Service (television), Recommendation ITU-R BT.709-5, Apr. 2002, 32 pages.

Suzuki et al., "Text of ISO/IEC 14496-10:2012/DAM 4 Additional Colour Space and Tone Mapping Descriptors", International Organization for Standardization (ISO), Coding of Moving Pictures and Associated Audio Information, ISO/IEC/JTC1/SC29/WG11, Document: N13553, Incheon, Korea, Apr. 2013, 20 pages.

Tech et al., "MV-HEVC Draft Text 8", Joint Collaborative Team on 3D Video Coding Extensions of ITU-T SG 16 WP 3 and ISO/IEC JTC 1/SC 29/WG 11, Document: JCT3V-H1002-v5, 8th Meeting, Valencia, Spain, Mar. 29, 2014, 164 pages.

Ramasubramonian et al., "Clarifications on the semantics of CRI SEI message and its usage for HDR/WCG video compression", Joint Collaborative Team on Video Coding (JCT-VC) of ITU-T SG 16 WP 3 and ISO/IEC JTC 1/ Sc 29/WG 11, Document: JCTVC-V0064, 22nd Meeting, Geneva, Switzerland, Oct. 15, 2015, 3 pages.

Anonymous, "Series H: Audiovisual and Multimedia Systems, Infrastructure of audiovisual services—Coding of moving video—Information Technology—Generic coding of moving pictures and associated audio information: Video", International Telecommuni-

(56) References Cited

OTHER PUBLICATIONS cation Union, ITU-T Telecommunication Standardization Sector of ITU, Recommendation ITU-T H.262, Feb. 2000, 220 pages.
Xiu et al., "Description of SDR, HDR and 360° Video Coding Technology Proposal by InterDigital Communications and Dolby Laboratories", Joint Video Experts Team (JVET) of ITU-T SG 16 WP 3 and ISO/IEC JTC1/SC 29/WG 11, Document: JVET-J0015-v1, 10th Meeting, San Diego, CA, USA, Apr. 10, 2018, 82 pages.
Bordes, Phillipe, "Colour Mapping SEI message", Joint Collaborative Team on Video Coding (JCTVC) of ITU-T SG 16 WP 3 and ISO/IEC JTC 1/SC 29/WG 11, 15th JCT-VC Meeting, Document: JCTVC-O0363, Power Point Presentation, Oct. 23, 2013, 11 pages.
Andrivon et al., "SEI message for Colour Mapping information" Joint Collaborative Team on Video Coding (JCT-VC) of ITU-T SG 16 WP 3 and ISO/IEC JTC 1/SC 29/WG 11, Document: JCTVC-P0126, 16th Meeting, San Jose, CA, USA, Jan. 9, 2014, 9 pages.
Marpe et al., "Macroblock-Adaptive Residual Color Space Transforms for 4:4:4 Video Coding", Institute of Electrical and Electronics Engineers (IEEE), 2006 International Conference on Image Processing, Atlanta, GA, USA, Oct. 8, 2006, 4 pages.
Boyce et al., "Draft high efficiency video coding (HEVC) version 2, combined format rangeextensions (RExt), scalability (SHVC), and multi-view (MV-HEVC) extensions", Joint Collaborative Team on Video Coding (JCT-VC) of ITU-T SG 16 WP 3 and ISO/IEC JTC 1/SC 29/WG 11, Document: JCTVC-R1013_v6, 18th Meeting: Sapporo, Japan, Jun. 30, 2014, 545 pages.
Andrivon et al., "SEI message for Colour Mapping Information", Joint Collaborative Team on Video Coding (JCT-VC) of ITU-T SG 16 WP 3 and ISO/IEC JTC 1/SC 29/WG 11, Document: JCTVC-P0126r1, 16th Meeting, San Jose, CA, USA, Jan. 9, 2014, 9 pages.
Tech et al., "MV-HEVC Draft Text 8", Joint Collaborative Team on 3D Video Coding Extensions of ITU-T SG 16 WP 3 and ISO/IEC JTC 1/SC 29/WG 11, Document: JCT3V-H1002-v5, 8th Meeting, Valencia, Spain, Mar. 29, 2014, 172 pages.
Bordes et al., "SHVC HLS: On persistence of Colour remapping SEI message", Joint Collaborative Team on Video Coding (JCT-VC) of ITU-T SG 16 WP 3 and ISO/IEC JTC 1/SC 29/WG 11, Document: JCTVC-R0344, 18th Meeting, Sapporo, Japan, Jun. 30, 2014, 5 pages.
Bross et al., "High Efficiency Video Coding (HEVC) text specification draft 10 (for FDIS & Last Call)", Joint Collaborative Team on Video Coding (JCT-VC) of ITU-T SG 16 WP 3 and ISO/IEC JTC 1/SC 29/WG 11, Document: JCTVC-L1003_v34, 12th Meeting, Geneva, Switzerland, Jan. 14, 2013, 310 pages.
Bross, et al., "Versatile Video Coding (Draft 10)", JVET-S2001-vH, Joint Video Experts Team (JVET) of ITU-T SG 16 WP 3 and ISO/IEC JTC 1/SC 29/WG 11, 19th Meeting: by teleconference, Jun. 22-Jul. 1, 2020, 548 pages.
ITU-T, "Versatile Supplemental Enhancement Information Messages for Coded Video Bitstreams", Recommendation ITU-T H.274, International Telecommunication Union, ITU-T Telecommunication Standardization Sector of ITU, Series H: Audiovisual and Multimedia Systems Infrastructure of Audiovisual Services—Coding of Moving Video, Aug. 2020, 86 pages.
ITU-T, "Versatile Video Coding", Recommendation Itu-T H.266, International Telecommunication Union, ITU-T Telecommunication Standardization Sector of ITU, Series H: Audiovisual and Multimedia Systems Infrastructure of Audiovisual Services—Coding of Moving Video, Aug. 2020, 516 pages.

METHOD AND DEVICE FOR LUMA MAPPING WITH CROSS COMPONENT SCALING

CROSS REFERENCE TO RELATED APPLICATIONS

This application is a U.S. National Stage Application under 35 U.S.C. § 371 of International Patent Application No. PCT/EP2021/084102, filed Dec. 3, 2021, which is incorporated herein by reference in its entirety.

This application claims priority to European Application No. 20306679.0, filed Dec. 23, 2020, which is incorporated herein by reference in its entirety.

1. TECHNICAL FIELD

At least one of the present embodiments generally relates to a method and a device for image encoding and decoding, and more particularly, to a method, a device and a signal for controlling an application of a luma mapping with cross component scaling process.

2. BACKGROUND ART

To achieve high compression efficiency, video coding schemes usually employ predictions and transforms to leverage spatial and temporal redundancies in a video content. During an encoding, images of the video content are divided into blocks of samples (i.e. Pixels), these blocks being then partitioned into one or more sub-blocks, called original sub-blocks in the following. An intra or inter prediction is then applied to each sub-block to exploit intra or inter image correlations. Whatever the prediction method used (intra or inter), a predictor sub-block is determined for each original sub-block. Then, a sub-block representing a difference between the original sub-block and the predictor sub-block, often denoted as a prediction error sub-block, a prediction residual sub-block or simply a residual block, is transformed, quantized and entropy coded to generate an encoded video stream. To reconstruct the video, the compressed data is decoded by inverse processes corresponding to the transform, quantization and entropic coding.

An original video signal to encode is constituted of a set of original values comprised in an original dynamic range of values generally represented by a number of bits ("8" bits for a dynamic range between "0" and "255", 10 bits for a dynamic range between "0" and "1023"). One effect of quantization is to represent several different values by a same quantized value. The video signal after quantization has therefore a reduced granularity comparing to the original video signal. However, in some video signals, a majority of original values are concentrated on a limited sub-range (or limited sub-ranges) of the original dynamic range. Applying a quantization defined for a dynamic range on a signal occupying only a limited sub-range of the dynamic range would affect strongly the granularity of the video signal. Luma mapping (i.e. mapping of luminance values) was proposed to improve the coding efficiency for video signals by making better use of a target dynamic range (i.e. the luma values are redistributed across the target dynamic range so as to occupy all the target dynamic range). The target dynamic range could be equal to or different from the original dynamic range.

In video signals, a luma signal is generally associated with chroma signals. When a process is applied on the luma signal to improve its granularity once quantized, a process should be applied to the associated chroma signals to obtain a similar improvement of the granularity. Applying a mapping on the chroma signals is possible but increases significantly the complexity of video encoding and decoding processes. In order to reduce the encoding/decoding complexity, some methods propose to apply a mapping only on the luma signal and to apply a scaling process to the chroma signals depending on the mapped luma signal. This scaling process is known under the term cross component scaling process.

A new compression tool called Luma Mapping with Chroma Scaling (LMCS) combining a luma mapping with a cross component scaling was introduced in the international standard entitled Versatile Video Coding (VVC) under development by a joint collaborative team of ITU-T and ISO/IEC experts known as the Joint Video Experts Team (JVET), called VVC in the following. LMCS was added as a new processing block before loop filters. LMCS applies therefore in a prediction loop of the encoding/decoding processes.

Applying a luma mapping with a cross component scaling in the prediction loop may not be optimal in terms of compression efficiency. Other configurations, such as applying luma mapping with a cross component scaling as a pre or post-processing out of the prediction loop could offer a better compression efficiency.

It is desirable to propose a solution allowing applying luma mapping with a cross component scaling, or more generally a cross-color component transform, in or out of the prediction loop.

3. BRIEF SUMMARY

In a first aspect, one or more of the present embodiments provide a method comprising obtaining a syntax element associated with video data, wherein said syntax element specifies that a cross-color component transform process in which at least one second color component is transformed based on at least one first color component different from the second color component is to be applied to the video data as a post processing process following a decoding process to be applied to the video data.

In an embodiment, the syntax element specifies that the cross-color component transform process is applied to the video data as a post processing process following the decoding process to be applied to the video data with a first value, and wherein the syntax element specifies that the cross-color component transform process is applied to the video data in a prediction loop comprised in the decoding process with a second value.

In an embodiment, the syntax element further specifies with a third value that samples of the first color component before an intra component transform have to be used for the cross-color component transform process of the at least one second component and with a fourth value that the samples of the first color component after the intra component transform have to be used for the cross-component transform of the at least one second component.

In an embodiment, the cross-color component transform process is specified in the syntax element by parameters representative of at least one transform.

In an embodiment, a transform intended to be applied on one of the at least one second color component is derived from parameters representative of a transform to be applied on another one of the at least one second color component specified in the syntax element or from parameters representative of a transform to be applied on the first color component specified in the syntax element.

In an embodiment, the syntax element specifies that parameters representative of the cross-color component transform process are derived from parameters specifying a luma mapping with chroma scaling process obtained from another syntax element.

In an embodiment, the cross-color component transform process is a luma mapping with chroma scaling process.

In an embodiment, the cross-color component transform process is applied to the video data as a post processing process following the decoding process to be applied to the video data responsive to a deactivation of a second cross-color component transform process to be applied in a prediction loop of the decoding process.

In a second aspect, one or more of the present embodiments provide a device comprising:
  means for obtaining a syntax element associated with video data, wherein said syntax element specifies that a cross-color component transform process in which at least one second color component is transformed based on at least one first color component different from the second color component is to be applied to the video data as a post processing process following a decoding process to be applied to the video data.

In an embodiment, the syntax element specifies that the cross-color component transform process is applied to the video data as a post processing process following the decoding process to be applied to the video data with a first value, and wherein the syntax element specifies that the cross-color component transform process is applied to the video data in a prediction loop comprised in the decoding process with a second value.

In an embodiment, the syntax element further specifies with a third value that samples of the first color component before an intra component transform have to be used for the cross-color component transform process of the at least one second component and with a fourth value that the samples of the first color component after the intra component transform have to be used for the cross-component transform of the at least one second component.

In an embodiment, the cross-color component transform process is specified in the syntax element by parameters representative of at least one transform.

In an embodiment, a transform intended to be applied on one of the at least one second color component is derived from parameters representative of a transform to be applied on another one of the at least one second color component specified in the syntax element or from parameters representative of a transform to be applied on the first color component specified in the syntax element.

In an embodiment, the syntax element specifies that parameters representative of the cross-color component transform process are derived from parameters specifying a luma mapping with chroma scaling process obtained from another syntax element.

In an embodiment, the cross-color component transform process is a luma mapping with chroma scaling process.

In an embodiment, the device comprises means for applying the cross-color component transform process to the video data as a post processing process following the decoding process to be applied to the video data responsive to a deactivation of a second cross-color component transform process to be applied in a prediction loop of the decoding process.

In a third aspect, one or more of the present embodiments provide a signal comprising a syntax element associated with video data, wherein said syntax element specifies that a cross-color component transform process in which at least one second color component is transformed based on at least one first color component different from the second color component is to be applied to the video data as a post processing process following a decoding process to be applied to the video data.

In an embodiment, the syntax element specifies that the cross-color component transform process is applied to the video data as a post processing process following the decoding process to be applied to the video data with a first value, and wherein the syntax element specifies that the cross-color component transform process is applied to the video data in a prediction loop comprised in the decoding process with a second value.

In an embodiment, the syntax element further specifies with a third value that samples of the first color component before an intra component transform have to be used for the cross-color component transform process of the at least one second component and with a fourth value that the samples of the first color component after the intra component transform have to be used for the cross-component transform of the at least one second component.

In an embodiment, the cross-color component transform process is specified in the syntax element by parameters representative of at least one transform.

In an embodiment, a transform intended to be applied on one of the at least one second color component is derived from parameters representative of a transform to be applied on another one of the at least one second color component specified in the syntax element or from parameters representative of a transform to be applied on the first color component specified in the syntax element.

In an embodiment, the syntax element specifies that parameters representative of the cross-color component transform process are derived from parameters specifying a luma mapping with chroma scaling process obtained from another syntax element.

In an embodiment, the cross-color component transform process is a luma mapping with chroma scaling process.

In a fourth aspect, one or more of the present embodiments provide a method comprising:
  signaling a syntax element associated with video data, wherein said syntax element specifies that a cross-color component transform process in which at least one second color component is transformed based on at least one first color component different from the second color component is to be applied to the video data as a post processing process following a decoding process to be applied to the video data.

In an embodiment, the syntax element specifies that the cross-color component transform process is applied to the video data as a post processing process following the decoding process to be applied to the video data with a first value, and wherein the syntax element specifies that the cross-color component transform process is applied to the video data in a prediction loop comprised in the decoding process with a second value.

In an embodiment, the syntax element further specifies with a third value that samples of the first color component before an intra component transform have to be used for the cross-color component transform process of the at least one second component and with a fourth value that the samples of the first color component after the intra component transform have to be used for the cross-component transform of the at least one second component.

In an embodiment, the cross-color component transform process is specified in the syntax element by parameters representative of at least one transform.

In an embodiment, a transform intended to be applied on one of the at least one second color component is derived from parameters representative of a transform to be applied on another one of the at least one second color component specified in the syntax element or from parameters representative of a transform to be applied on the first color component specified in the syntax element.

In an embodiment, the syntax element specifies that parameters representative of the cross-color component transform process are derived from parameters specifying a luma mapping with chroma scaling process obtained from another syntax element.

In an embodiment, the cross-color component transform process is a luma mapping with chroma scaling process.

In a fifth aspect, one or more of the present embodiments provide a device comprising:

means for signaling a syntax element associated with video data, wherein said syntax element specifies that a cross-color component transform process in which at least one second color component is transformed based on at least one first color component different from the second color component is to be applied to the video data as a post processing process following a decoding process to be applied to the video data.

In an embodiment, the syntax element specifies that the cross-color component transform process is applied to the video data as a post processing process following the decoding process to be applied to the video data with a first value, and wherein the syntax element specifies that the cross-color component transform process is applied to the video data in a prediction loop comprised in the decoding process with a second value.

In an embodiment, the syntax element further specifies with a third value that samples of the first color component before an intra component transform have to be used for the cross-color component transform process of the at least one second component and with a fourth value that the samples of the first color component after the intra component transform have to be used for the cross-component transform of the at least one second component.

In an embodiment, the cross-color component transform process is specified in the syntax element by parameters representative of at least one transform.

In an embodiment, a transform intended to be applied on one of the at least one second color component is derived from parameters representative of a transform to be applied on another one of the at least one second color component specified in the syntax element or from parameters representative of a transform to be applied on the first color component specified in the syntax element.

In an embodiment, the syntax element specifies that parameters representative of the cross-color component transform process are derived from parameters specifying a luma mapping with chroma scaling process obtained from another syntax element.

In an embodiment, the cross-color component transform process is a luma mapping with chroma scaling process.

In a sixth aspect, one or more of the present embodiments provide a computer program comprising program code instructions for implementing the method according to the first or the fourth aspect.

In a seventh aspect, one or more of the present embodiments provide an information storage medium storing program code instructions for implementing the method according to the first or the fourth aspect.

4. BRIEF SUMMARY OF THE DRAWINGS

5. DETAILED DESCRIPTION

In the following description, some embodiments use tools developed in the context of VVC or in the context of HEVC ((ISO/IEC 23008-2—MPEG-H Part 2, High Efficiency Video Coding/ITU-T H.265)). However, these embodiments are not limited to the video coding/decoding methods corresponding to VVC or HEVC and applies to other video coding/decoding methods such as AVC (H.264/MPEG-4 part 10), EVC (Essential Video Coding/MPEG-5), AV1 and VP9 but also to image coding/decoding methods.

Figure 1:
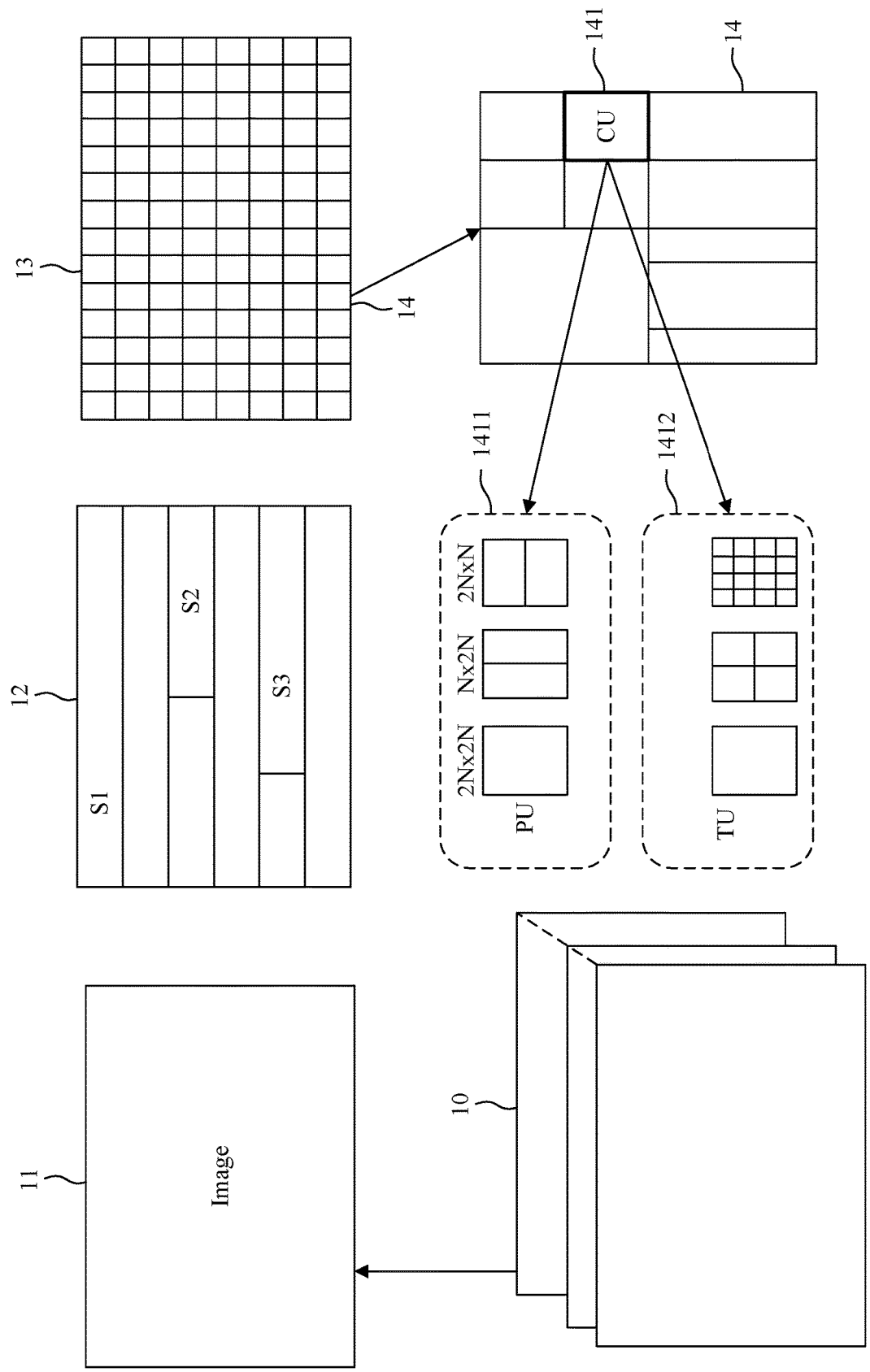
FIG. 1 illustrates an example of partitioning undergone by an image of pixels of an original video.
Figure 2:
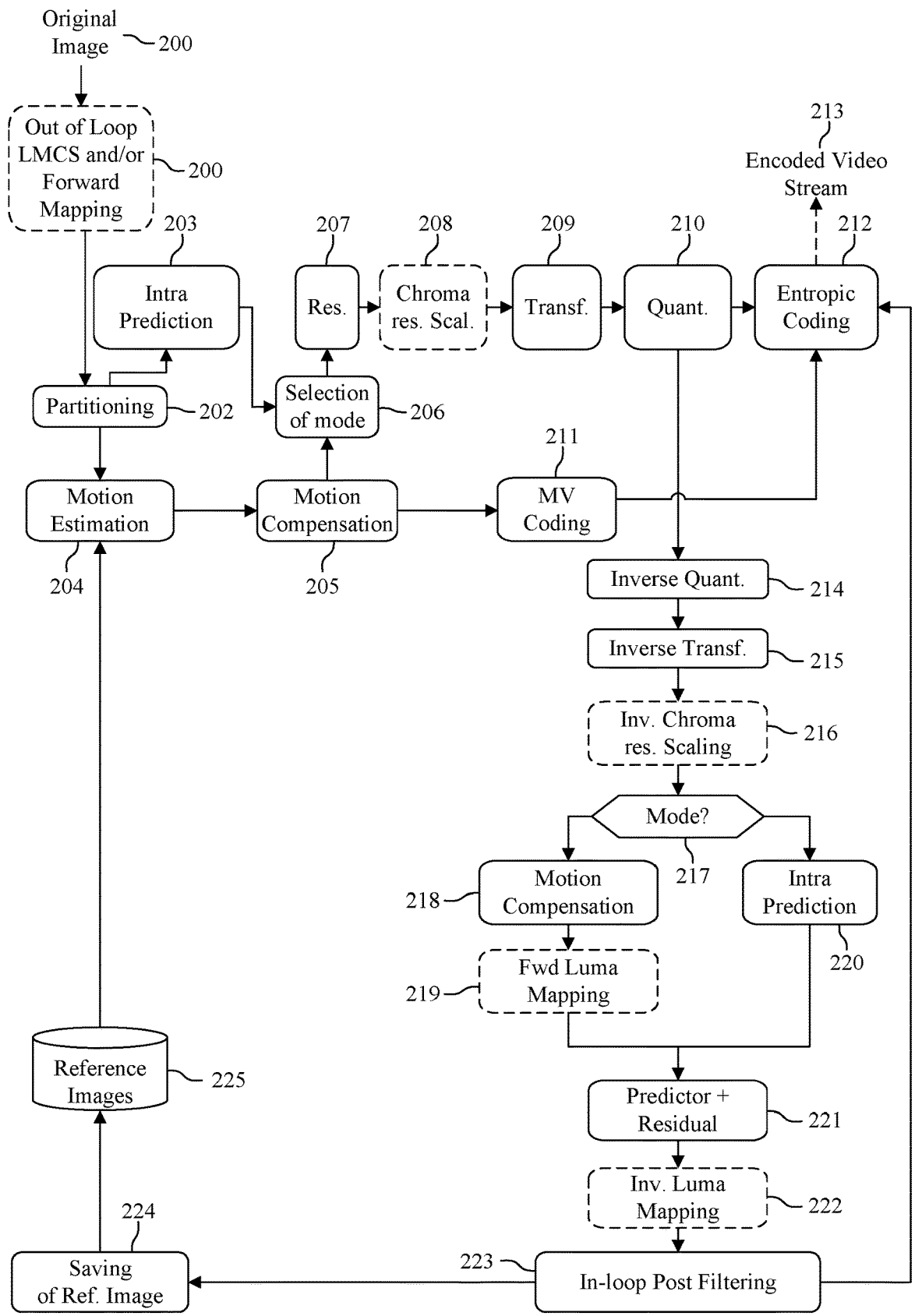
FIG. 2 depicts schematically a method for encoding a video stream executed by an encoding module.
Figure 3:
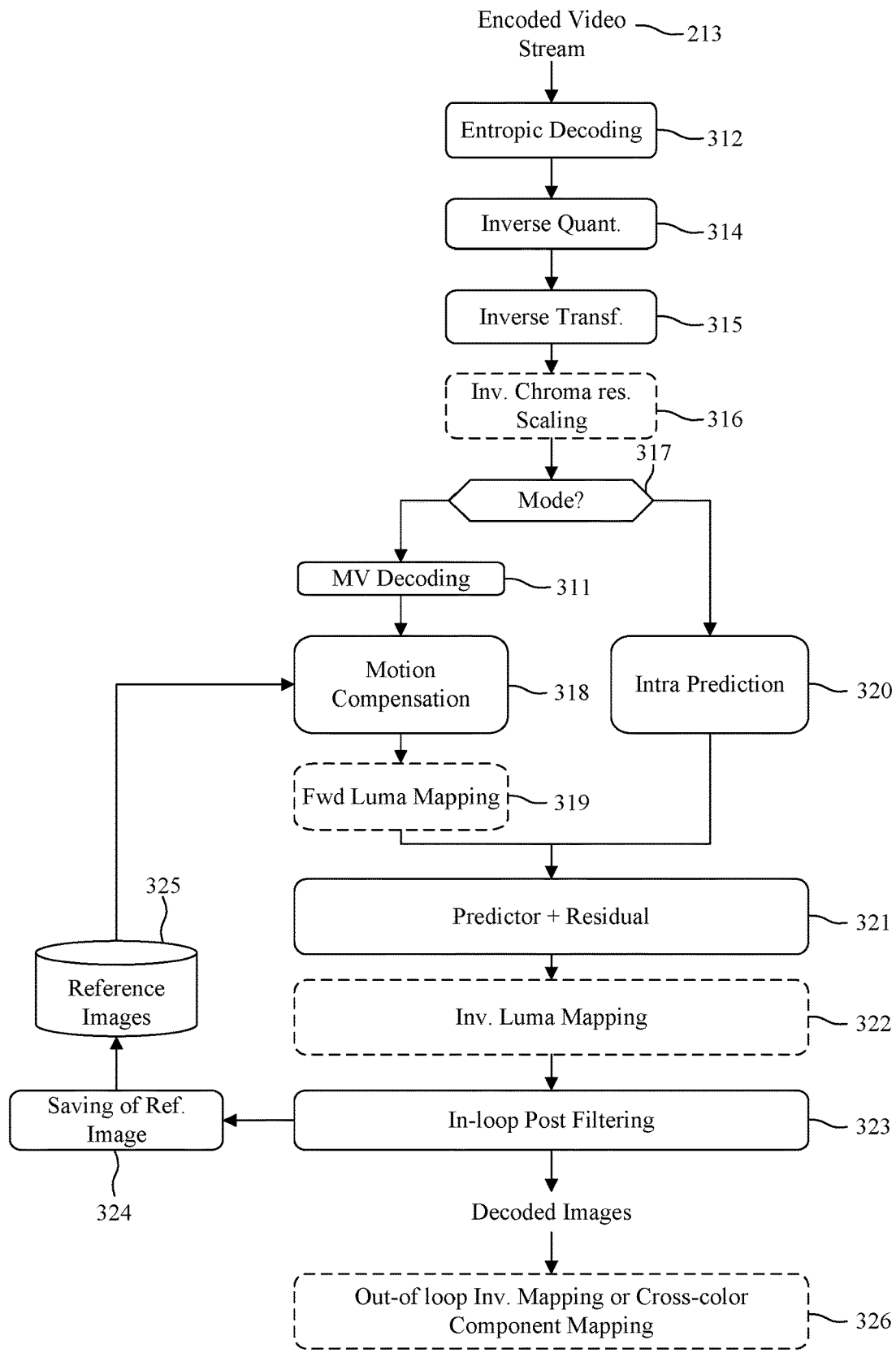
FIG. 3 depicts schematically a method for decoding the encoded video stream (i.e. the bitstream) executed by a decoding module.

In relation to FIGS. 1, 2 and 3, we describe a video compression method.

FIG. 1 illustrates an example of partitioning undergone by an image of samples 11 of an original video 10. It is considered here that a sample is composed of three components: a luminance (or luma) component and two chrominance (or chroma) components. In that case, a sample corresponds to a pixel. However, the following embodiments are adapted to images constituted of samples comprising another number of components, for instance grey level samples wherein samples comprise one component, or images constituted of samples comprising three color components and a transparency component and/or a depth component.

An image is divided in a plurality of coding entities. First, as represented by reference 13 in FIG. 1, an image is divided in a grid of blocks called coding tree units (CTU). A CTU consists of an N×N block of luminance samples together with two corresponding blocks of chrominance samples. N is in general a power of two having, for example, a maximum value of "128". Second, an image is divided into one or more groups of CTU. For example, it can be divided into one or more tile rows and tile columns, a tile being a sequence of CTU covering a rectangular region of an image. In some cases, a tile could be divided into one or more bricks, each of which consisting of at least one row of CTU within the tile. Above the concept of tiles and bricks, another encoding entity, called slice, exists, that can contain at least one tile of an image or at least one brick of a tile.

In the example in FIG. 1, as represented by reference 12, the image 11 is divided into three slices S1, S2 and S3, each comprising a plurality of tiles (not represented).

As represented by reference 14 in FIG. 1, a CTU may be partitioned in the form of a hierarchical tree of one or more sub-blocks called coding units (CU). The CTU is the root (i.e. the parent node) of the hierarchical tree and can be partitioned in a plurality of CU (i.e. child nodes). Each CU becomes a leaf of the hierarchical tree if it is not further partitioned in smaller CU or becomes a parent node of smaller CU (i.e. child nodes) if it is further partitioned. Several types of hierarchical trees can be applied comprising for example a quadtree, a binary tree and a ternary tree. In a quadtree, a CTU (respectively a CU) can be partitioned in (i.e. can be the parent node of) "4" square CU of equal sizes. In a binary tree, a CTU (respectively a CU) can be partitioned horizontally or vertically in "2" rectangular CU of equal sizes. In a ternary tree, a CTU (respectively a CU) can be partitioned horizontally or vertically in "3" rectangular CU. For example a CU of height N and width M is vertically (respectively horizontally) partitioned in a first CU of height N (resp. N/4) and width M/4 (resp. M), a second CU of height N (resp. N/2) and width M/2 (resp. M), and a third CU of height N (resp. N/4) and width M/4 (resp. M).

In the example of FIG. 1, the CTU 14 is first partitioned in "4" square CU using a quadtree type partitioning. The upper left CU is a leaf of the hierarchical tree since it is not further partitioned, i.e. it is not a parent node of any other CU. The upper right CU is further partitioned in "4" smaller square CU using again a quadtree type partitioning. The bottom right CU is vertically partitioned in "2" rectangular CU using a binary tree type partitioning. The bottom left CU is vertically partitioned in "3" rectangular CU using a ternary tree type partitioning.

The combination of binary tree and ternary tree is known as Multi-type tree (MTT).

During the coding of an image, the partitioning is adaptive, each CTU being partitioned in order to optimize a compression efficiency of the CTU criterion.

In some compression method appeared concepts of prediction unit (PU) and transform unit (TU). In that case, the coding entity that is used for prediction (i.e. a PU) and transform (i.e. a TU) can be a subdivision of a CU. For example, as represented in FIG. 1, a CU of size 2N×2N, can be divided in PU 1411 of size N×2N or of size 2N×N. In addition, said CU can be divided in "4" TU 1412 of size N×N or in "16" TU of size (N/2)×(N/2).

In the present application, the term "block" or "image block" or "sub-block" can be used to refer to any one of a CTU, a CU, a PU and a TU. In addition, the term "block" or "image block" can be used to refer to a macroblock, a partition and a sub-block as specified in MPEG-4/AVC or in other video coding standards, and more generally to refer to an array of samples of numerous sizes.

In the present application, the terms "reconstructed" and "decoded" may be used interchangeably, the terms "pixel" and "sample" may be used interchangeably, the terms "image," "picture", "sub-picture", "slice" and "frame" may be used interchangeably.

FIG. 2 depicts schematically a method for encoding a video stream executed by an encoding module. Variations of this method for encoding are contemplated, but the method for encoding of FIG. 2 is described below for purposes of clarity without describing all expected variations.

The encoding of a current original image 200 begins with a partitioning of the current original image 200 during a step 202, as described in relation to FIG. 1. The current image 200 is thus partitioned into CTU, CU, PU, TU, etc. For each block, the encoding module determines a coding mode between an intra prediction and an inter prediction.

The intra prediction, represented by step 203, consists of predicting, in accordance with an intra prediction method, the samples of a current block from a prediction block derived from samples of reconstructed blocks situated in a causal vicinity of the current block to be coded. The result of the intra prediction is a prediction direction indicating which samples of the blocks in the vicinity to use, and a residual block resulting from a calculation of a difference between the current block and the prediction block.

The inter prediction consists of predicting the samples of a current block from a block of samples, referred to as the reference block, of an image preceding or following the current image, this image being referred to as the reference image.

During the coding of a current block in accordance with the inter prediction method, a block of the reference image closest, in accordance with a similarity criterion, to the current block is determined by a motion estimation step 204. During step 204, a motion vector indicating the position of the reference block in the reference image is determined. Said motion vector is used during a motion compensation step 205 during which a residual block is calculated in the form of a difference between the current block and the reference block.

In the first video compression standards, the mono-directional inter prediction mode described above was the only inter mode available. As video compression standards evolved, the family of inter modes has grown significantly and comprises now many different inter modes.

During a selection step 206, the prediction mode optimizing compression performances, in accordance with a rate/distortion criterion (i.e. RDO criterion), among the prediction modes tested (Intra prediction modes, Inter prediction modes) is selected by the encoding module.

When the prediction mode is selected, the residual block corresponding to the selected prediction mode is obtained in a step 207 (for instance from residual blocks computed in steps 203 and 205), transformed during a step 209 and quantized during a step 210. During the quantization, in transformed domain, the transformed coefficients are weighted by a scaling matrix in addition to the quantization parameter. The scaling matrix is a coding tool allowing favoring some frequencies at the expense of other frequencies. In general, low frequencies are favored.

Note that the encoding module can skip the transform and apply quantization directly to the non-transformed residual signal.

When the current block is coded according to an intra prediction mode, a prediction direction and the transformed and quantized residual block are encoded by an entropic encoder during a step 212.

When the current block is encoded according to an inter prediction mode, the motion data associated with this inter prediction mode are encoded in a step 211.

In general, two modes can be used to encode the motion data, respectively called AMVP (Adaptive Motion Vector Prediction) and Merge.

AMVP basically consists in signaling a reference image(s) used to predict a current block, a motion vector predictor index and a motion vector difference (also called motion vector residual).

The merge mode consists in signaling an index of some motion data collected in a list of motion data predictors. The list is made of "5" or "7" candidates and is constructed the same way on the decoder and encoder sides. Therefore, the merge mode aims at deriving some motion data taken from the merge list. The merge list typically contains motion data associated to some spatially and temporally neighboring blocks, available in their reconstructed state when the current block is being processed.

Once predicted, the motion information is next encoded by the entropic encoder during step 212, along with the transformed and quantized residual block. Note that the encoding module can bypass both transform and quantization, i.e., the entropic encoding is applied on the residual without the application of the transform or quantization processes. The result of the entropic encoding is inserted in an encoded video stream (i.e. a bitstream) 213.

Note that the entropic encoder can be implemented in a form of a context adaptive binary arithmetic coder (CABAC). CABAC encodes binary symbols, which keeps the complexity low and allows probability modelling for more frequently used bits of any symbol.

After the quantization step 210, the current block is reconstructed so that the pixels corresponding to that block can be used for future predictions. This reconstruction phase is also referred to as a prediction loop. An inverse quantization is therefore applied to the transformed and quantized residual block during a step 214 and an inverse transformation is applied during a step 215. According to the prediction mode used for the current block obtained during a step 217, the prediction block of the current block is reconstructed. If the current block is encoded according to an inter prediction mode, the encoding module applies, when appropriate, during a step 218, a motion compensation to a reference block using the motion information of the current block. If the current block is encoded according to an intra prediction mode, during a step 220, the prediction direction corresponding to the current block is used for reconstructing the reference block of the current block.

In a step 221, the reference block and the reconstructed residual block are added in order to obtain the reconstructed current block.

Following the reconstruction, an in-loop post-filtering intended to reduce the encoding artefacts is applied, during a step 223, to the reconstructed block. This post-filtering is called in-loop post-filtering since this post-filtering occurs in the prediction loop to obtain at the encoder the same reference images as the decoder and thus avoid a drift between the encoding and the decoding processes. For instance, the in-loop post-filtering comprises a deblocking filtering, a SAO (sample adaptive offset) filtering and an Adaptive Loop Filtering (ALF) with block-based filter adaption.

Parameters representative of the activation or the deactivation of the in-loop deblocking filter and when activated, of characteristics of said in-loop deblocking filter are introduced in the encoded video stream 213 during the entropic coding step 212.

When a block is reconstructed, it is inserted during a step 224 into a reconstructed image stored in a decoded picture buffer (DPB) 225. The reconstructed images thus stored can then serve as reference images for other images to be coded.

FIG. 3 depicts schematically a method for decoding the encoded video stream (i.e. the bitstream) 213 encoded according to method described in relation to FIG. 2. The method for decoding is executed by a decoding module. Variations of this method for decoding are contemplated, but the method for decoding of FIG. 3 is described below for purposes of clarity without describing all expected variations.

The decoding is done block by block. For a current block, it starts with an entropic decoding of the current block during a step 312. Entropic decoding allows to obtain the prediction mode of the current block.

If the current block has been encoded according to an intra prediction mode, the entropic decoding allows to obtain, information representative of an intra prediction direction and a residual block.

If the current block has been encoded according to an inter prediction mode, the entropic decoding allows to obtain, information representative of motion data and a residual block. When appropriate, during a step 311, the motion data are reconstructed for the current block according to the AMVP or the merge mode. In the merge mode, the motion data obtained by the entropic decoding comprise an index in a list of motion vector predictor candidates. The decoding module applies the same process than the encoding module to construct the list of candidates for the regular merge mode and a sub-block merge mode. With the reconstructed list and the index, the decoding module is able to retrieve a motion vector used to predict the motion vector of a block.

The method for decoding comprises steps 312, 314, 315, 317, 318, 319, 320, 321 and 323 in all respects identical respectively to steps 212, 214, 215, 217, 218, 219, 220, 221 and 223 of the method for encoding. Decoded blocks are saved in decoded images and the decoded images are stored in a DPB 325 in a step 324. When the decoding module decodes a given image, the images stored in the DPB 325 are identical to the images stored in the DPB 225 by the encoding module during the encoding of said given image. The decoded image can also be outputted by the decoding module for instance to be displayed.

As mentioned above variations of the encoding of FIG. 2 and of the decoding method of FIG. 3 are contemplated and in particular variations comprising a luma mapping with cross component scaling process or more generally a cross-color component transform. In the following luma mapping with cross component scaling and cross-color component transform are used indifferently. Indeed, in luma mapping with cross component scaling, chroma components are transformed based on the luma component. In cross-color component transform, at least one first color component is transformed based on at least one second color component different from the first color component. The concept of cross-color component transform is therefore broader than the concept of the luma mapping with cross component scaling. However, the various embodiments described below applies to cross-color component transform and luma mapping with cross component scaling.

The introduction of a luma mapping with cross component scaling process in the encoding and decoding method can take different forms.

In a first embodiment, the luma mapping with cross component scaling (LMCCS) process is implemented in the prediction loop.

An example of implementation of a LMCCS process in the prediction loop (i.e. an example of the first embodiment) is LMCS LMCS has two main components:

in-loop mapping of the luma component based on adaptive piecewise linear models;

for the chroma components, luma-dependent chroma residual scaling is applied.

The in-loop mapping of the luma makes use of a forward luma mapping function, FwdMap, and a corresponding inverse luma mapping function, InvMap. The forward luma mapping function FwdMap is signaled using a piecewise linear model with "16" equal pieces. The inverse luma mapping function InvMap does not need to be signaled and is instead derived from the forward luma mapping function FwdMap.

The luma mapping function is signaled in a container called adaptation parameter set (APS) using a piecewise linear model. The piecewise linear model partitions an input signal's dynamic range into "16" equal pieces, and for each piece, its linear mapping parameters are expressed using a number of codewords assigned to that piece. Take 10-bit input signal as an example. Each of the "16" pieces have "64" codewords assigned to it by default. The signaled number of codewords is used to calculate a scaling factor and adjust the forward luma mapping function accordingly for that piece. Each piece of the piecewise linear model is defined by two input pivot points and two output (mapped) pivot points.

On the decoding side, as represented in FIG. 3, the forward luma mapping function is applied during step 319. The inverse luma mapping function is applied in step 322. As can be seen in FIG. 3, for an inter-predicted block, motion compensation is performed in the original domain. After a motion-compensated prediction block Y_pred is calculated based on a reference image in the DPB 325, the forward mapping function FwdMap is applied to map the luma component of the prediction block Y_pred from the original domain (i.e. the original dynamic range) to the mapped domain (i.e. the target dynamic range): Y'_pred=FwdMap(Y_pred). For an intra-coded block, the forward mapping function FwdMap function is not applied because intra prediction is performed in the mapped domain.

After a reconstructed block Y_r is calculated from the prediction block Y_pred and a residual block Y_res in step 321, the inverse mapping function InvMap is applied to convert the reconstructed luma values from the mapped domain back to the original domain during step 322: Y_i=InvMap(Y_r). The inverse mapping function InvMap is applied to both intra- and inter-coded luma blocks.

The luma mapping process (forward and/or inverse mapping) can be implemented using either look-up-tables (LUT) or using on-the-fly computation.

The luma-dependent chroma residual scaling is designed to compensate for the interaction between the luma signal and its corresponding chroma signals. If luma mapping is enabled, an additional flag is signaled to indicate if luma-dependent chroma residual scaling is enabled or not.

The luma-dependent chroma residual scaling depends on an average value of top and/or left reconstructed neighboring luma samples. Denote avgYr as the average of the reconstructed neighboring luma samples. A value of a scaling factor C_ScaleInv is computed in the following steps:

1. Find an index Y_Idx of the piecewise linear model to which avgYr belongs based on the InvMap function.
2. C_ScaleInv=cScaleInv[Y_Idx], where cScaleInv[ ] is a 16-piece LUT pre-computed based on values signaled in APS.

Unlike luma mapping and inverse luma mapping, which are performed on a sample basis, the scaling factor C_ScaleInv is a constant value for an entire chroma block.

On the decoding side, the luma-dependent chroma residual scaling process is applied on a scaled chroma residual block before the reconstruction of a current chroma block in a step 316. A chroma residual block C_Res is obtained by scaling the scaled chroma residual block using the scaling factor C_ScaleInv:

$C\_Res = C\_ResScale * C\_ScaleInv.$

The residual block C_res is then added to a chroma predictor block C_pred to reconstruct the current chroma block C_r in step 321:

$C\_r = C\_Res + C\_pred.$

As can be seen, for chroma, no inverse mapping before in-loop filtering nor forward mapping after motion compensation is performed.

On the encoding side, the introduction of LMCS is represented by the introduction of steps 201 and 208, 216, 219 and 222 in the method for encoding of FIG. 2. Steps 216, 219 and 222 are respectively identical to step 316, 319 and 322. Step 201 is identical to step 219 except in that case, the LMCCS process is applied on an original image, while it is applied on a reconstructed image in step 219.

The luma-dependent chroma residual scaling process is applied on a chroma residual block in step 208. A scaled chroma residual block C_ResScale is obtained by scaling the chroma residual block using the scaling factor C_ScaleInv:

$C\_ResScale = C\_Res / C\_ScaleInv.$

As mentioned earlier, in some implementations, LMCS parameters are stored in an APS container of type LMCS_APS. The LMCS parameters are stored in a syntax element called lmcs_data.

TABLE TAB1

```
lmcs_data( ) {
    lmcs_min_bin_idx
    lmcs_delta_max_bin_idx
    lmcs_delta_cw_prec_minus1
    for( i = lmcs_min_bin_idx; i <= LmcsMaxBinIdx; i++ ) {
        lmcs_delta_abs_cw[ i ]
        if( lmcs_delta_abs_cw[ i ] > 0 )
            lmcs_delta_sign_cw_flag[ i ]
    }
    if( aps_chroma_present_flag ) {
        lmcs_delta_abs_crs
        if( lmcs_delta_abs_crs > 0 )
            lmcs_delta_sign_crs_flag
    }
}
```

Table TAB1 represents the syntax element lmcs_data. The semantic of the syntax elements of the syntax element lmcs_data can be found in section 7.4.3.19 of document JVET-S2001vH, Versatile Video Coding (Draft 10), Joint Video Experts Team (JVET) of ITU-T SG 16 WP 3 and ISO/IEC JTC 1/SC 29/WG 11, 19th Meeting: by teleconference, 22 Jun.-1 Jul. 2020.

According to some implementation, the forward luma mapping function is then defined by parameters lmcsCW[i] (representing a number of codewords in the $i^{est}$ piece), InputPivot[i] (representing an input pivot point of the $i^{est}$ piece), lmcsPivot[i] (representing an output pivot point of the $i^{est}$ piece), for i=0 to "15" or "16", derived as follows (equation numbers are the ones of the VVC specification, document ITU-T H.266, SERIES H: AUDIOVISUAL AND MULTIMEDIA SYSTEMS, Infrastructure of audiovisual services—Coding of moving video, Versatile video coding, August 2020).

A parameter LmcsMaxBinIdx is set equal to ("15"-lmcs_delta_max_bin_idx). The text below is in italic is copied from the VVC specification.

The variable OrgCW is derived as follows:

$$Org CW=(1<<BitDepth)/16 \quad (93)$$

The variable lmcsDeltaCW[i] with i=lmcs_min_bin_idx . . . LmcsMaxBinIdx, is derived as follows:

$$lmcsDeltaCW[i]=(1-2*lmcs\_delta\_sign\_cw\_flag[i])*lmcs\_delta\_abs\_cw[i] \quad (94)$$

The variable lmcsCW[i] is derived as follows:
For i=0 . . . lmcs_min_bin_idx−1, lmcsCW[i] is set equal 0.
For i=lmcs_min_bin_idx . . . LmcsMaxBinIdx, the following applies:

$$lmcsCW[i]=OrgCW+lmcsDeltaCW[i] \quad (95)$$

The value of lmcsCW[i] shall be in the range of OrgCW>>3 to (OrgCW<<3)−1, inclusive.
For i=LmcsMaxBinIdx+1.15, lmcsCW[i] is set equal 0.
It is a requirement of bitstream conformance that the following condition is true:

$$\Sigma_{i=0}^{15}lcmsCW[i]<=(1<<BitDepth)-1 \quad (96)$$

The variable InputPivot[i] with i=0 . . . 15, is derived as follows:

$$InputPivot[i]=i*OrgCW \quad (97)$$

The variable LmcsPivot[i] with i=0 . . . 16, the variables ScaleCoeff[i] and InvScaleCoeff[i] with i=0 . . . 15, are derived as follows:

```
LmcsPivot[ 0 ] = 0
for(i = 0; i <= 15; i++ ) {
    LmcsPivot[ i + 1 ] = LmcsPivot[ i ] + lmcsCW[ i ]
    ScaleCoeff[ i ] = ( lmcsCW[ i ] * (1 << 11 ) + ( 1 <<
( Log2( OrgCW ) − 1 ) ) ) >> ( Log2( OrgCW ) )
    if( lmcsCW[ i ] = = 0 )                                  (98)
        InvScaleCoeff[ i ] = 0
    else
        InvScaleCoeff[ i ] = OrgCW * ( 1 << 11 ) / lmcsCW[ i ]
}
```

Figure 10A:
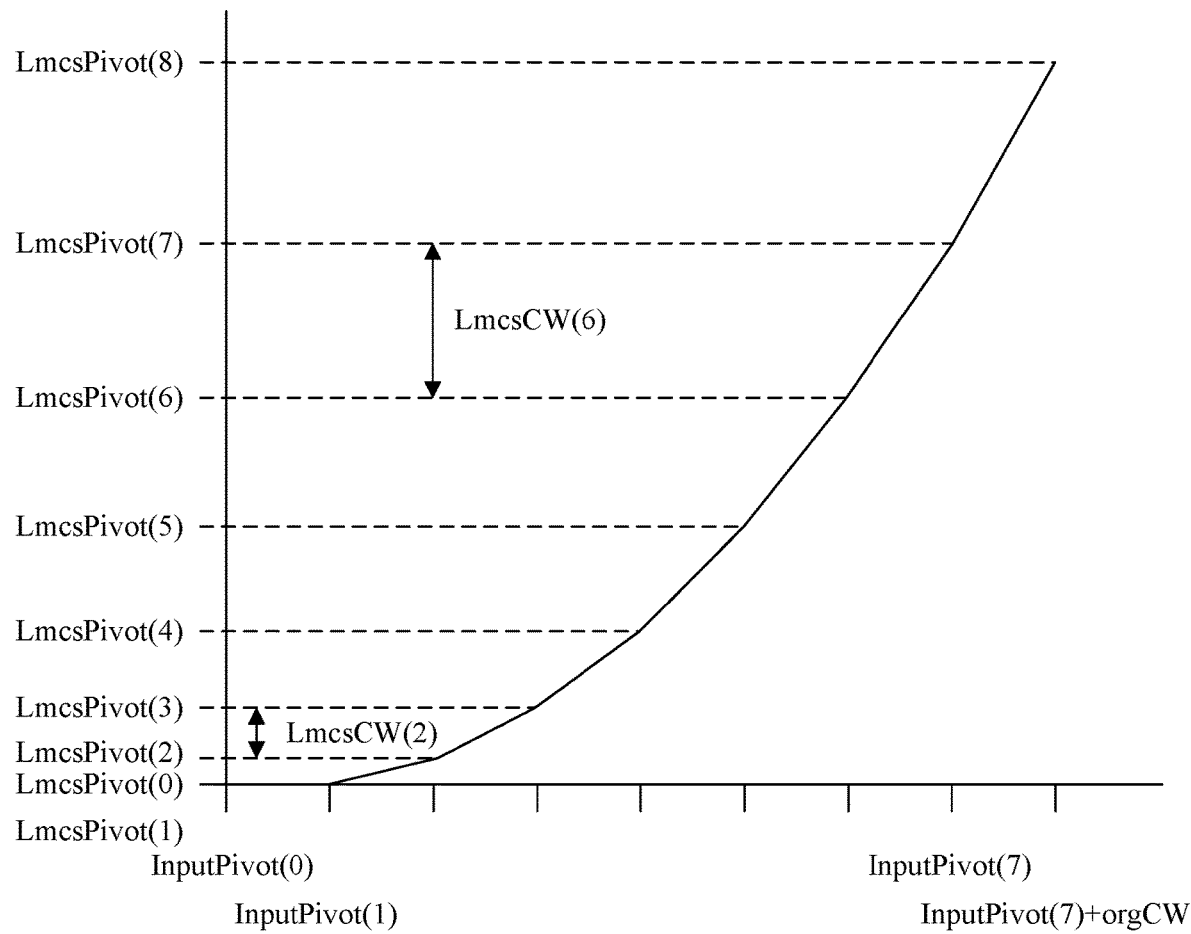
FIG. 10A illustrates a construction of a LMCS forward mapping function using 8 segments; and, FIG. 10B illustrates a derivation of parameters of a cross-component transform from LMCS parameters.

An illustration using 8 segments (instead of 16) of a LMCS forward mapping function construction is provided in FIG. 10A. As seen above, applying the LMCCS process in the prediction loop is one possible embodiment, but other embodiments exist.

In a second embodiment, the LMCSS process is applied out of the prediction loop.

On the decoding side, comparing to the first embodiment, steps 316, 319 and 322 are removed from the method for decoding of FIG. 3. A new post-processing step 326 is introduced. When the LMCSS process is LMCS, the inverse mapping function InvMap is applied to convert the reconstructed luma values of the reconstructed images from the mapped domain back to the original domain. The scaling factor C_ScaleInv, determined using the process described above, is applied on the chroma values of the reconstructed images.

On the encoding side, comparing to the first embodiment, steps 208, 216, 219 and 222 are removed from the method for encoding of FIG. 2. Step 201 remains identical.

The first and the second embodiment are particularly adapted to control the granularity of the quantized luma and chroma signals. However, an LMCSS process could be used for other purpose.

In a third embodiment, an LMCSS process is used to map the output of the decoding process from the original dynamic range to a target dynamic range. For example, the LMCSS process is used to enhance (e.g. with higher quality graded content like UHDTV Rec.2020) a coded video if a display is capable of displaying such enhanced data. It also makes it possible to gracefully degrade (e.g. Rec.709 colorist grade) a wide colour gamut graded content (e.g. Rec.2020 colorist grade).

In the third embodiment, comparing to the second embodiments, steps 201, 208, 216, 219, 222, 316, 319 and 322 are removed from the method for encoding and the method for decoding. Step 326 is kept but consists in applying forward mapping functions instead of inverse mapping functions. When the LMCSS process is LMCS, during step 326, the forward mapping function fwdMap is applied to convert the reconstructed luma values of the reconstructed images from the original domain to the mapped domain. The scaling factor 1/C_ScaleInv is applied on the chroma values of the reconstructed images.

In a fourth embodiment, the first and the third embodiments or the second and the third embodiments are combined.

In video compression standards of last generations, two syntax elements are known to allow transporting data related to color mapping:
The APS as mentioned above to transport LMCS parameters; and,
A SEI message called Color Remapping Information (CRI).

A SEI (Supplemental Enhancement Information) message as defined for example in standards such as AVC, HEVC or VVC is a data container associated to a video stream and comprising metadata providing information relative to the video stream.

TABLE TAB2

```
colour_remapping_info( payloadSize ) {
    colour_remap_id
    colour_remap_cancel_flag
    if( !colour_remap_cancel_flag ) {
        colour_remap_persistence_flag
        colour_remap_video_signal_info_present_flag
        if( colour_remap_video_signal_info_present_flag ) {
            colour_remap_full_range_flag
            colour_remap_primaries
            colour_remap_transfer_function
            colour_remap_matrix_coefficients
        }
        colour_remap_input_bit_depth
        colour_remap_output_bit_depth
        for(c = 0; c < 3; c++ ) {
            pre_lut_num_val_minus1[ c ]
            if( pre_lut_num_val_minus1[ c ] > 0 )
                for( i = 0; i <= pre_lut_num_val_minus1[ c ]; i++ ) {
                    pre_lut_coded_value[ c ][ i ]
                    pre_lut_target_value[ c ][ i ]
                }
        }
```

TABLE TAB2-continued

```
    colour_remap_matrix_present_flag
    if( colour_remap_matrix_present_flag ) {
        log2_matrix_denom
        for( c = 0; c < 3; c++ )
            for( i = 0; i < 3; i++ )
                colour_remap_coeffs[ c ][ i ]
    }
    for( c = 0; c < 3; c++ ) {
        post_lut_num_val_minus1[ c ]
        if( post_lut_num_val_minus1[ c ] > 0 )
            for( i = 0; i <= post_lut_num_val_minus1[ c ]; i++ ) {
                post_lut_coded_value[ c ][ i ]
                post_lut_target_value[ c ][ i ]
            }
        }
    }
}
```

Table TAB2 provide the syntax of the CRI SEI message as defined in section D.2.23 of the HEVC specification. The semantic of the syntax elements comprised in the CRI SEI message is provided in section D.3.33 of HEVC. The CRI SEI message provides information to enable mapping of the reconstructed color samples of the images outputted by a decoder for purposes such as converting the output images to a representation that is more suitable for an alternative display.

The CRI SEI defines three transforms:
the first transform (called pre_lut in the following) is based on three 1D-LUTs applying to each color component;
the second transform is based a 3×3 matrix; and,
the third transform (called post_lut in the following) is based on three 1D-LUTs applying to each color component.

The three transforms can be cascaded. When the 3×3 matrix transform is enabled, the color components must be processed in 4:4:4 format, which means that there are three color samples per pixel. When only a 1D-LUTs transform is used, the process can apply in 4:2:0, 4:2:2 or 4:4:4 color formats, since each color sample is processing independently from the others. The cascaded transforms are illustrated in the equations below for three color components noted C0, C1, C2, respectively. Input samples C0_in(p), C1_in(p), C2_in(p) at relative position p in a picture are processed as follows to generate output samples C0_out(p), C1_out(p), C2_out(p):

First Transform Application $$C0'=\text{pre\_lut}[0][C0\_\text{in}(p)]$$

$$C1'=\text{pre\_lut}[1][C1\_\text{in}(p)]$$

$$C2'=\text{pre\_lut}[2][C2\_\text{in}(p)] \quad\quad (\text{eq.1})$$

where pre_lut[0][ ] represents the first transform applied to the first component, pre_lut[1][ ] represents the first transform applied to the second component, pre_lut[2][ ] represents the first transform applied to the third component.

3×3 Matrix Application (when it Applies):

$$(C0'',C1'',C2'')^T = M3 \times 3 \cdot (C0',C1',C2')^T \quad\quad (\text{eq.2})$$

where M3×3 is the 3×3 matrix (syntax element colour_remap_coeffs[c][i]) and ( )$^T$ is the transpose operator.

Second Transform Application:

$$C0\_\text{out}(p)=\text{post\_lut}[0][C0'']$$

$$C1\_\text{out}(p)=\text{post\_lut}[1][C1'']$$

$$C2\_\text{out}(p)=\text{post\_lut}[2][C2''] \quad\quad (\text{eq.3})$$

where post_lut[0][ ] represents the second transform applied to the first component, post_lut[1][ ] represents the second transform applied to the second component, post_lut[2][ ] represents the second transform applied to the third component.

It is noted that the 1D-LUTs apply independently to each color component, which correspond to an intra-component transform.

As can be seen the CRI SEI message is not adapted to provide parameters of a LMCCS process and more generally to a cross-color component transform. In addition, the CRI SEI message provides color mapping parameters for a post-processing process. On its side, the APS container of type LMCS_APS is designed to provide parameters for a LMCCS process (here LMCS) wherein the LMCCS process is applied in the prediction loop. The CRI SEI message and the APS container of type LMCS_APS are therefore not compliant to each embodiment evocated above.

Solutions are therefore needed to support LMCCS processes and more generally to support cross-color component transform.

According to a fifth embodiment, a new transform is added to the CRI SEI message to enable a cross-color component transform. The new transform is based on 1D-LUTs and applies as follows (illustrated below using the first transform(pre_lut)). In a variant, this can be extended to the second transform case (post_lut).

The input samples of the first color component C0_in are mapped to the output samples of the first component C0_out for each pixel at relative position p using an intra-component transform pre_lut:

$$C0\_\text{out}(p)=\text{pre\_lut}[0][C0\_\text{in}(p)] \quad\quad (\text{eq.4})$$

The input samples of the second and third color components C1_in(p) and C2_in(p) are respectively mapped to the output samples of the second and third components C1_out (p) and C2_out (p), using a cross-component transform, as follows:

$$C1\_\text{out}(p)=\text{pre\_lut}[1][C0\text{coloc}(p)]*(C1\_\text{in}(p)-2*B1-1)+2*B1-1$$

$$C2\_\text{out}(p)=\text{pre\_lut}[2][C0\text{coloc}(p)]*(C2\_\text{in}(p)-2*B2-1)+2*B2-1 \quad\quad (\text{eq.5})$$

where B1 and B2 are a bit-depths of the second and third color component samples, respectively, and C0coloc(p) is a value computed from the first component samples located at or close to the relative position p.

According to the fifth embodiment, a syntax element colour_remap_pre_lut_cross_component_flag is added in the CRI SEI message to indicate if the 1D LUTs representing the first transform pre_lut for the second and third components are used as intra-component transform, or as cross-component transform.

In a variant of the first embodiment, a similar syntax element colour_remap_post_lut_cross_component_flag is added to the CRI SEI message for the second transform post_lut.

Table TAB3 illustrates the insertion of the syntax elements colour_remap_pre_lut_cross_component_flag and colour_remap_post_lut_cross_component_flag in the CRI SEI message. The new syntax elements are represented in bold.

In a variant, syntax elements can also be inserted to indicate if the samples from the first component used in the cross-component transform are used before or after they have been transformed by the first transform.

An example of semantics for the new syntax elements is the following:

colour_remap_pre_lut_cross_component_flag equal to "1" indicates that (i.e. the transforms pre_lut[1][i] and pre_lut[2][i] represented respectively by) the syntax elements pre_lut_coded_value[1][i] and pre_lut_coded_value[2][i] define piece-wise linear scaling functions indexed by values depending on the first color component samples and applying to the second and third color component samples, respectively. colour_remap_pre_lut_cross_component_flag equal to "0" indicates that (i.e. the transforms pre_lut[1][i] and pre_lut[2][i] represented respectively by) the syntax elements pre_lut_coded_value[1][i] and pre_lut_coded_value[2][i] define piece-wise linear functions applying to the second and third color component samples, respectively.

colour_remap_pre_lut_cross_comp_mode indicates that the transforms of the second and third color component samples defined by the syntax elements pre_lut_coded_value[1][i] and pre_lut_coded_value[2][i], respectively, depend on the first color component samples before (colour_remap_pre_lut_cross_comp_mode equal to "0") or after (colour_remap_pre_lut_cross_comp_mode equal to "1") they are processed by the transform defined by (i.e. the transform pre_lut[0][i] represented by) the syntax elements pre_lut_coded_value[0][i].

colour_remap_post_lut_cross_component_flag has the same semantics as colour_remap_pre_lut_cross_component_flag with "pre" replaced by "post".

colour_remap_post_lut_cross_comp_mode has the same semantics as colour_remap_pre_lut_cross_comp_mode with "pre" replaced by "post".

TABLE TAB3

```
colour_remapping_info( payloadSize ) {
    ...
    if( !colour_remap_cancel_flag ) {
        ...
        colour_remap_input_bit_depth
        colour_remap_output_bit_depth
        colour_remap_pre_lut_cross_component_flag
        if (colour_remap_pre_lut_cross_component_flag)
            colour_remap_pre_lut_cross_comp_mode
        for(c=0; c < 3; c++ ) {
            pre_lut_num_val_minus1 [ c ]
            if( pre_lut_num_val_minus1 [ c ] > 0)
                for( i = 0; i <= pre_lut_num_val_minus1[ c ]; i++ ) {
                    pre_lut_coded_value[ c ][ i ]
                    pre_lut_target_value[ c ][ i ]
                }
        }
        colour_remap_matrix_present_flag
        if( colour_remap_matrix_present_flag ) {
            log2_matrix_denom
            for( c = 0; c < 3; c++ )
                for( i = 0; i < 3; i++ )
                    colour_remap_coeffs[ c ][ i ]
        }
        colour_remap_post_lut_cross_component_flag
        if (colour_remap_post_lut_cross_component_flag)
            colour_remap_post_lut_cross_comp_mode
```

TABLE TAB3-continued

```
        for( c = 0; c < 3; c++ ) {
            post_lut_num_val_minus1[ c ]
            if( post_lut_num_val_minus1[ c ] > 0 )
                for( i = 0; i <= post_lut_num_val_minus1[ c ]; i++ ) {
                    post_lut_coded_value[ c ][ i ]
                    post_lut_target_value[ c ][ i ]
                }
        }
    }
}
```

Figure 5:
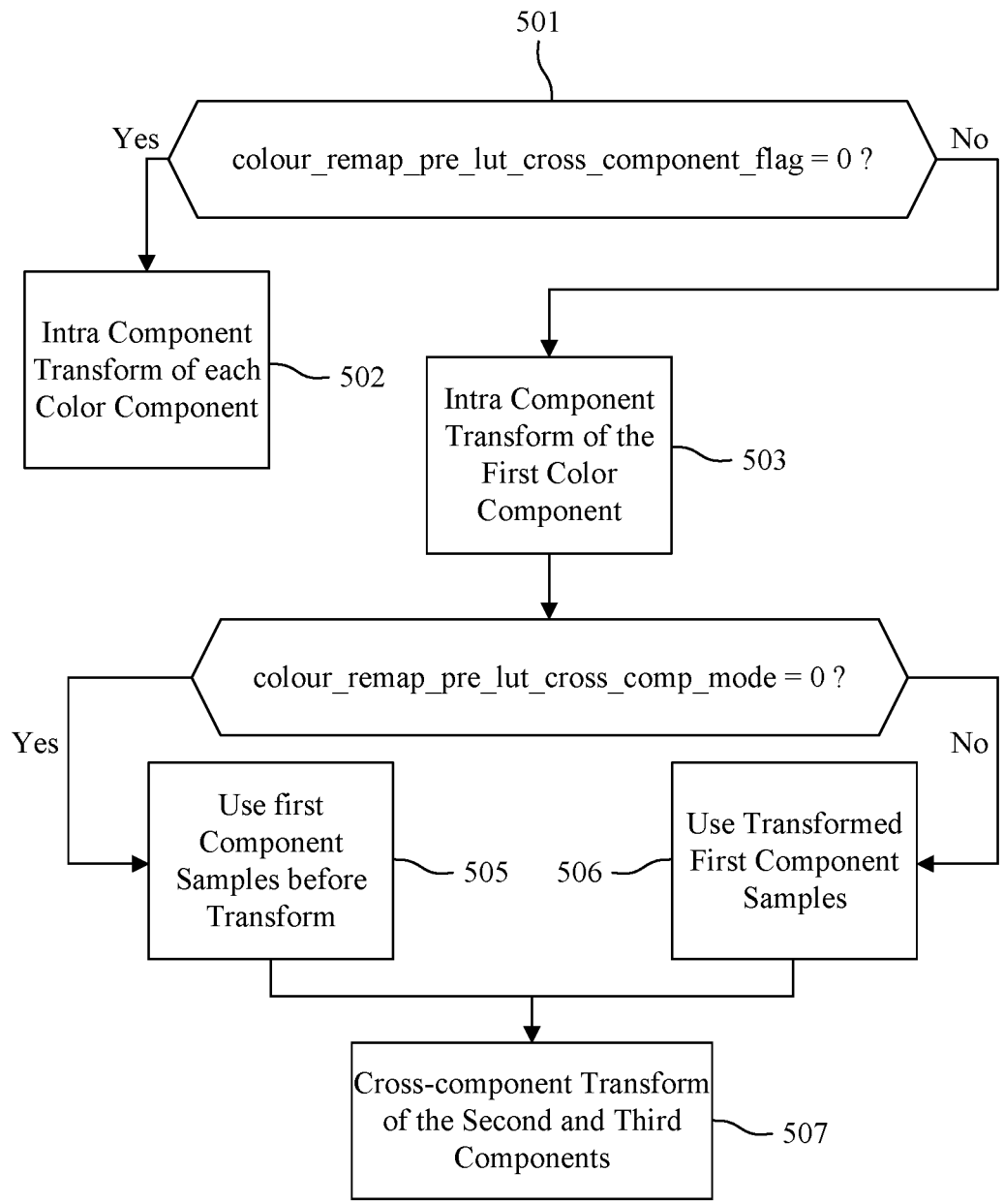
FIG. 5 illustrates schematically a parsing of the modified Color Remapping Information (CRI) SEI message.

FIG. 5 illustrates schematically a parsing of the modified CRI SEI message. FIG. 5 focuses on the new syntax elements introduced in the CRI SEI message, as represented in table TAB3.

Figure 4A:
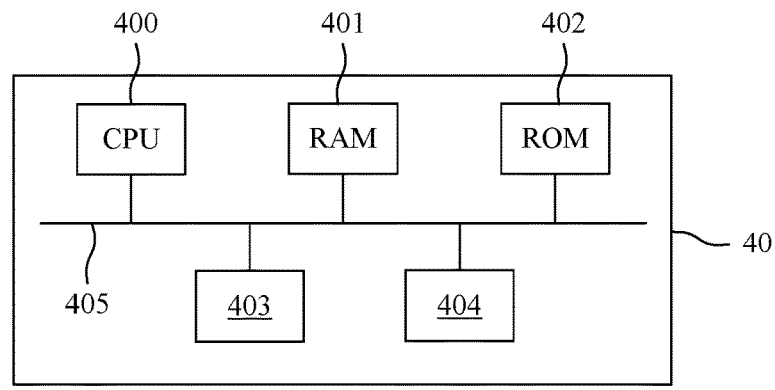
FIG. 4A illustrates schematically an example of hardware architecture of a processing module able to implement an encoding module or a decoding module in which various aspects and embodiments are implemented.
Figure 4B:
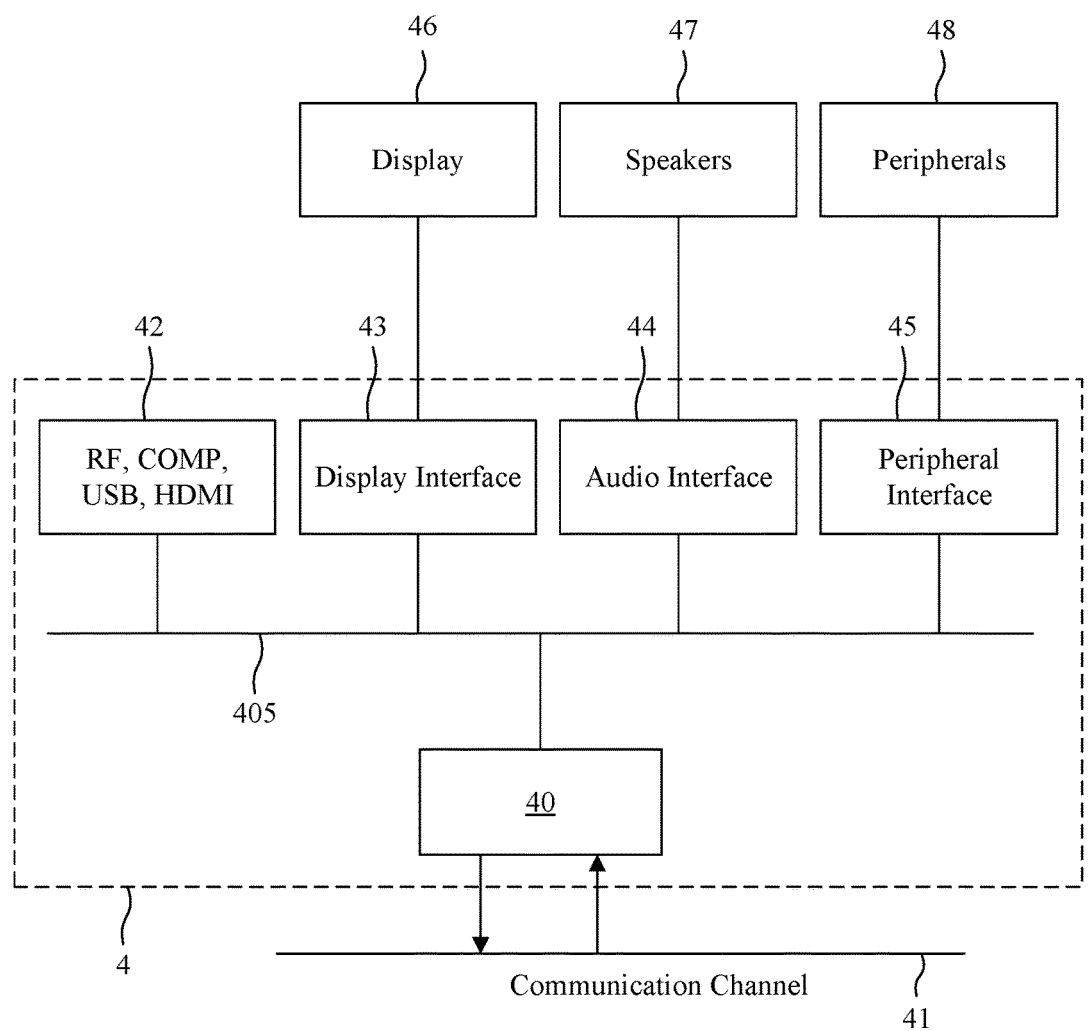
FIG. 4B illustrates a block diagram of an example of a system in which various aspects and embodiments are implemented.

The process of FIG. 5 is executed by a processing module 40 described latter in relation to FIGS. 4A and 4B during the parsing of a CRI SEI message.

In a step 501, the processing module 40 obtains the syntax element colour_remap_pre_lut_cross_component_flag and determines if the syntax element colour_remap_pre_lut_cross_component_flag is equal to zero. If the syntax element colour_remap_pre_lut_cross_component_flag is equal to zero, the processing module 40 applies an intra-component transform on each color component using equations eq. 1, eq. 2 and eq. 3 in a step 502.

Otherwise, in a step 503, the processing module 40 applies an intra component transform to the first color component using equation eq. 4. The syntax element colour_remap_pre_lut_cross_component_flag equal to "1" specifies therefore that a cross-color component transform process is to be applied. By default (i.e. without further information), this cross-color component transform process is to be applied as a post processing process following the decoding process.

In a step 504, the processing module 40 determines if the syntax element colour_remap_pre_lut_cross_comp_mode is equal to zero. If the syntax element colour_remap_pre_lut_cross_comp_mode is equal to zero, the processing module 40 determines that samples of the first component before the intra component transform have to be used for the cross-color component transform of the second and third components.

Otherwise, the processing module 40 determines in a step 506 that the transformed samples of the first component after the intra component transform have to be used for the cross-component transform of the second and third components.

Steps 505 and 506 are followed by step 507 during which the processing module 40 applies a cross-component transform to the second and third components using equations eq. 5 and transformed or non-transformed samples of the first component as determined in step 505 and 506.

In a variant, a syntax element colour_remap_in_loop_flag is added to the CRI SEI message (as represented in bold in table TAB4) to indicate if the cross-color component transform is achieved inside the prediction loop of the video decoding process, or after the decoding process as a post-processing.

TABLE TAB4

```
colour_remapping_info( payloadSize ) {
    colour_remap_id
    colour_remap_in_loop_flag
    colour_remap_cancel_flag
    ...
```

Figure 6:
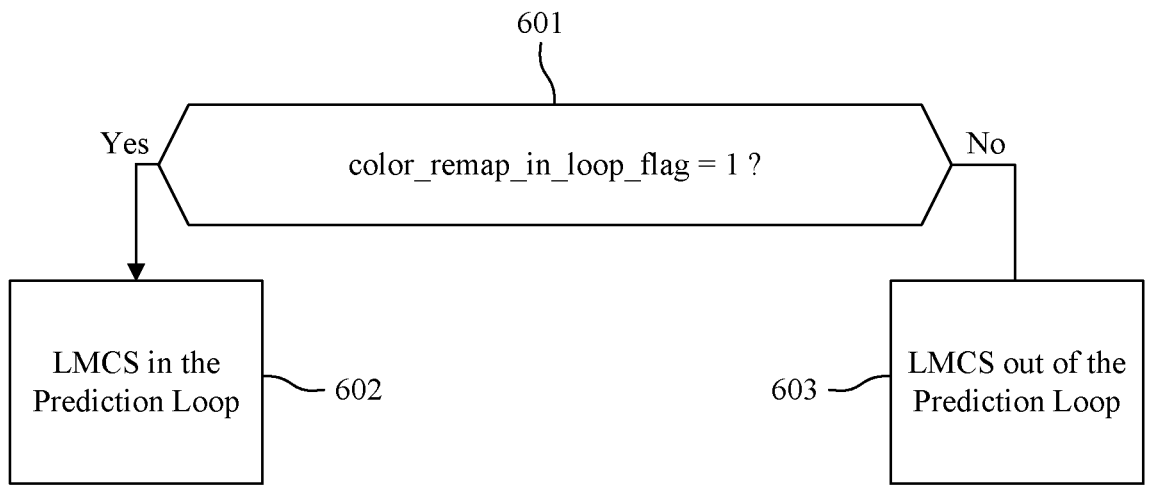
FIG. 6 illustrates schematically a parsing of a CRI SEI message by a decoding module.

FIG. 6 illustrates schematically a parsing of a CRI SEI message by a decoding module.

The process of FIG. 6 focuses on the parsing of the syntax element colour_remap_in_loop_flag.

In a step 601, the processing module 40 of the decoding module determines if the syntax element colour_remap_in_loop_flag is equal to "1".

If the syntax element colour_remap_in_loop_flag is equal to "1", in a step 602, the cross-color component transform (for example LMCS) is applied in the prediction loop as described in the first embodiment. If the syntax element colour_remap_in_loop_flag is equal to "0", in a step 603, the cross-color component transform (for example LMCS) is applied after the decoding process as a post-processing as described in the second and third embodiments.

In a variant represented in table TAB5, when the cross-component transform is enabled, a syntax element colour_remap_pre_lut_number_minus1 is added to indicate if one or two LUTs are signaled for cross-component transform of the second and third color components. For example, if colour_remap_pre_lut_number_minus1 is equal to "0", only the transform pre_lut[i][i] (represented by the syntax element pre_lut_coded_value[1][i]) is signaled and the transform pre_lut[2][i] (represented by the syntax element pre_lut_coded_value[2][i]) is set equal to the transform pre_lut[1][i]. If colour_remap_pre_lut_number_minus1 is equal to "1", both transforms are signaled.

In a variant represented in table TAB5, when the cross-component transform is enabled, a syntax element colour_remap_pre_lut_cross_component_inferred_flag is added to indicate if the transforms pre_lut[1][i] and pre_lut[2][1] used for cross-component transform of the second and third color components are explicitely signalled or are inferred from the transform related to the first color component. For example, if colour_remap_pre_lut_cross_component_inferred_flag is equal to "0", the transforms are signaled. if colour_remap_pre_lut_cross_component_inferred_flag is equal to "1", the transforms pre_lut[1][i] and pre_lut[2][i] are inferred from the transform pre_lut[0][i]. For example, the transforms pre_lut[1][i] and pre_lut[2][i] are computed as the slope, or a filtered version of the slope values of the transform pre_lut [0][i].

TABLE TAB5

```
colour_remapping_info( payloadSize ) {
    ...
    if( !colour_remap_cancel_flag ) {
        ...
        colour_remap_input_bit_depth
        colour_remap_output_bit_depth
        colour_remap_pre_lut_cross_component_flag
        if (colour_remap_pre_lut_cross_component_flag) {
            colour_remap_pre_lut_cross_comp_mode
            colour_remap_pre_lut_cross_component_inferred_flag
            if (colour_remap_pre_lut_cross_component_inferred_flag = = 0)
                colour_remap_pre_lut_number_minus1
        }
        ...
```

In a sixth embodiment, instead of using an SEI message to convey the metadata, the metadata are conveyed in an Adaptive Parameter Set (APS).

The parameters for the cross-component mapping are embedded in the VVC LMCS syntax contained in an APS of type LMCS_APS.

In the sixth embodiment, a syntax element lmcs_in_loop_flag is added in the APS of type LMCS_APS to indicate if the LMCS process is achieved inside the prediction loop of video decoding process, or after the video decoding process as a post-processing, as described in equations eq.4 and 5.

TABLE TAB6

```
lmcs_data( ) {
    lmcs_in_loop_flag
    lmcs min bin idx
    lmcs delta max bin idx
    lmcs_delta_cw_prec_minus1
    for( i = lmcs min bin idx; i <= LmcsMaxBinIdx; i++ ) {
        lmcs_delta_abs_cw[ i ]
        if( lmcs_delta_abs_cw[ i ] > 0)
            lmcs_delta_sign_cw_flag[ i ]
    }
    if( aps_chroma_present_flag ) {
        lmcs_delta abs_crs
        if( lmcs_delta abs_crs > 0)
            lmcs_delta_sign_crs_flag
    }
}
```

Table TAB6 illustrates an insertion of the syntax element lmcs_in_loop_flag (in bold) in the syntax element lmcs_data of the APS of type LMCS_APS.

Figure 7:
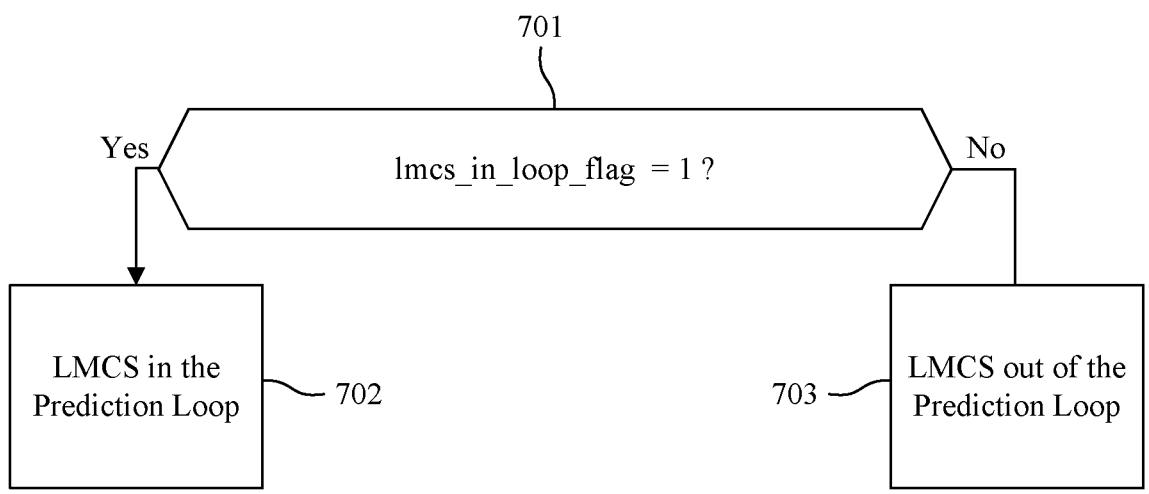
FIG. 7 illustrates schematically a parsing of an APS of the LMCS_APS type by a decoding module.

FIG. 7 illustrates schematically a parsing of an APS of the LMCS_APS type by a decoding module.

The process of FIG. 7 focuses on the parsing of the syntax element lmcs_in_loop_flag.

In a step 701, the processing module 40 of the decoding module determines if the syntax element lmcs_in_loop_flag is equal to "1".

If the syntax element lmcs_in_loop_flag is equal to "1", in a step 702, the LMCS process is applied in the prediction loop as described in the first embodiment. If the syntax element lmcs_in_loop_flag is equal to "0", in a step 703, the LMCS process is applied after the decoding process as a post-processing as described in the second and third embodiments.

In a variant of the sixth embodiment, when the cross-component transform is selected in the CRI SEI message, a flag colour_remap_pre_lut_from_APS_flag is inserted in the CRI SEI message to indicate that the parameters of the cross-component transform are inherited (i.e. derived) from the LMCS parameters embedded in an APS of the bitstream.

When colour_remap_pre_lut_from_APS_flag flag is true, a parameter colour_remap_pre_lut_from_APS_id is added to indicate an identifier of the APS to be referred to. The identifier of the APS is for example the syntax element aps adaptation parameter set id. The syntax elements pre_lut_num_val_minus1, pre_lut_coded_value, pre_lut_target_value are inferred from the syntax element lmcs_data signaled in the APS.

An example of inferring process is described below:
pre_lut_num_val_minus1[c] are set to "16", as in LMCS "16" segments are used for c=0 to 2 representing the color components.
pre_lut_coded_value[0][i] is set to lmcsPivot[i] for i=0 to "16".

pre_lut_target_value[0][i] is set to InputPivot[i] for i=0 to "16".

For the transforms of components "1" and "2" represented by the LUTs pre_lut[1][i] and pre_lut[2][i], the following can apply, for c=1 and "2", and i=0 to "15":

pre_lut_coded_value[c][i]=pre_lut_coded_value[0][i]
   slope=pre_lut_target_value[0][i+1]−pre_lut_target_value[0][i]
   if slope=0 pre_lut_target_value[c][i]=2048
   otherwise prelut_target_value[c][i]=OrgCW*2048/slope The value "2048" corresponds to a neutral cross-component scaling, that is, equal to "1.0" in floating point representation.

Figure 10B:
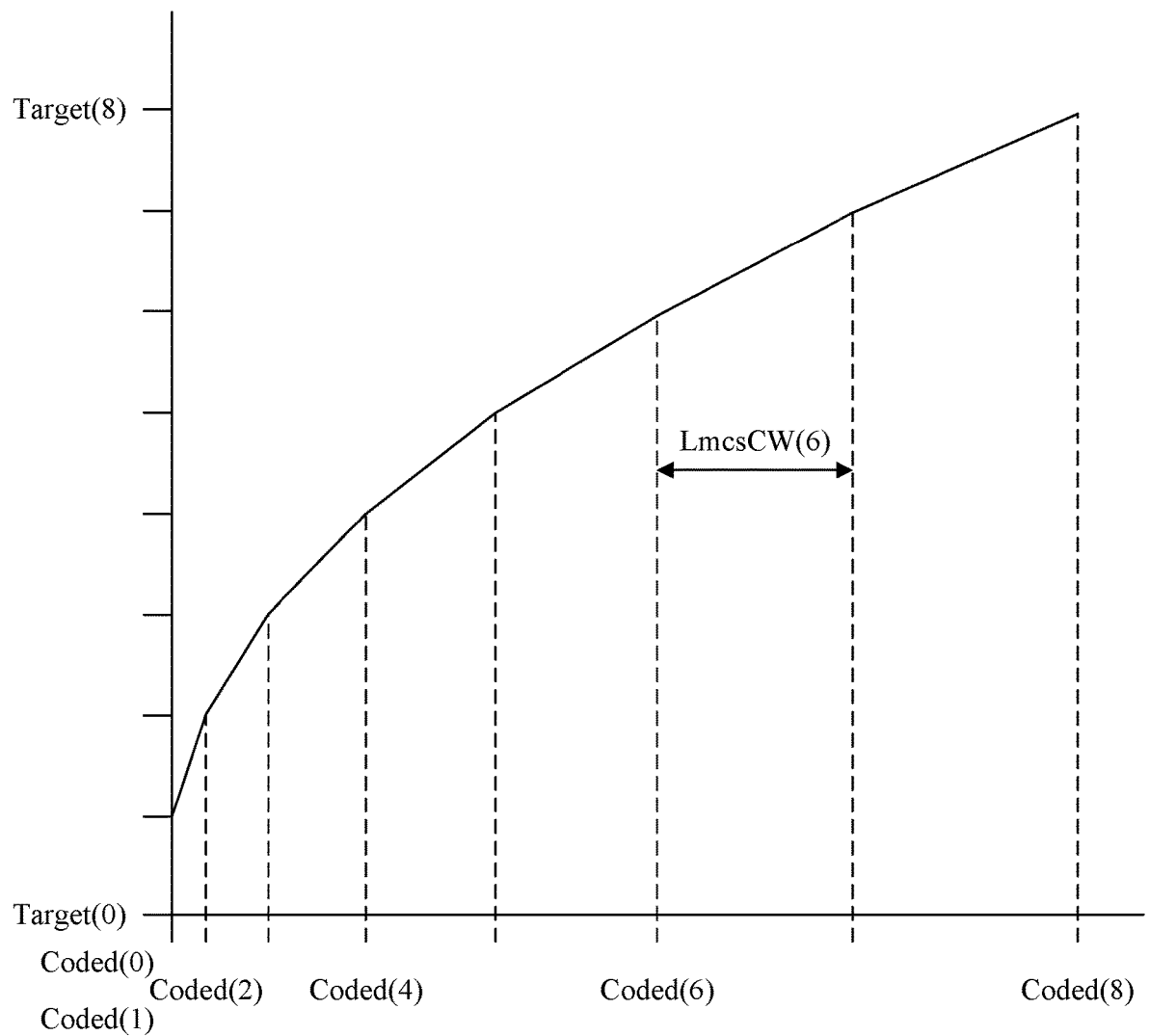

An illustration using the function depicted in FIG. 10A is provided in FIG. 10B.

TABLE TAB7

```
colour_remapping_info( payloadSize ) {
  ...
  if( !colour_remap_cancel_flag ) {
    ...
    colour_remap_input_bit_depth
    colour_remap_output_bit_depth
    colour_remap_pre_lut_cross_component_flag
    if (colour_remap_pre_lut_cross_component_flag) {
      colour_remap_pre_lut_from_APS_flag
      if (colour_remap_pre_lut_from_APS_flag) {
        colour_remap_pre_lut_from_APS_id
      }
    }
    ...
    for( c= 0; c < 3; c++ ) {
      pre_lut_num_val_minus1[ c ]
      if( pre_lut_num_val_minus1[ c ] > 0 )
        for( i = 0; i <= pre_lut_num_val_minus1[ c ]; i++ ) {
          pre_lut_coded_value[ c ][ i ]
          pre_lut_target_value[ c ][ i ]
        }
    }
  ...
}
```

Table TAB7 illustrates the insertion of the syntax elements colour_remap_pre_lut_cross_component_flag, colour_remap_pre_lut_from_APS_flag, colour_remap_pre_lut_from_APS_id, (in bold) in the CRI SEI message.

The same principle applies for the transform post_lut (by replacing "pre" by "post").

Alternatively, a syntax element indicating if the LMCS process is achieved inside the prediction loop of the video decoding process, or after the video decoding process as a post-processing can also be inserted in other high-level syntax structures such as SPS (sequence parameter set), PPS (picture parameter set), picture header, slice header, tile header, sub-picture header. Preferably, this syntax element should be inserted in the SPS, PPS or picture header, as it is expected to apply to entire pictures, and even to set of pictures comprised into one intra period (in other words, inserted with an IDR picture).

TABLE TAB8

```
seq_parameter_set_rbsp( ) {
  sps_seq_parameter_set_id
  sps_video_parameter_set_id
  ... ...
  sps_sao_enabled_flag
  sps_alf_enabled_flag
  if( sps_alf_enabled_flag && sps_chroma_format_idc != 0 )
    sps_ccalf_enabled_flag
  sps_lmcs_enabled_flag
  if(sps_lmcs enabled_flag != 0 )
```

TABLE TAB8-continued

```
    sps_lmcs_inloop_flag
  sps_weighted_pred_flag
  sps_weighted_bipred_flag
```

Table TAB8 illustrates a modification (represented in bold) of the SPS syntax wherein a syntax element sps_lcms_in_loop_flag has been added. If the syntax element sps_lmcs_in_loop_flag is equal to "1", the LMCS process is applied in the prediction loop as described in the first embodiment. If the syntax element sps_lcms_in_loop_flag is equal to "0", the LMCS process is applied after the decoding process as a post-processing as described in the second and third embodiments.

Alternatively, a constraint flag for gci_no_lcms_in_loop_constraint_flag may be defined as illustrated in table TAB9.

TABLE TAB9

```
general_constraints_info( ) {
  /* loop filter */
  gci_no_sao_constraint_flag
  gci_no_alf_constraint_flag
  gci_no_ccalf_constraint_flag
  gci_no_lmcs_constraint flag
  gci_no_lmcs_in_loop_constraint_flag
  gci_no_ladf_constraint_flag
  gci_no_virtual_boundaries_constraint_flag
  gci_num_reserved_bits
  for( i = 0; i < gci_num_reserved_bits; i++ )
    gci_reserved_zero_bit[ i ]
}
```

With the following definition:
  gci_no_lmcs_constraint_flag equal to "1" specifies that sps_lmcs_enabled_flag for all pictures in OlsInScope shall be equal to "0". gci_no_lmcs_constraint_flag equal to "0" does not impose such a constraint.
  gci_no_lmcs_in_loop_constraint_flag equal to "1" specifies that sps_lmcs_in_loop_flag for all pictures in OlsInScope shall be equal to "0" and that colour_remap_in_loop_flag if received shall be equal to 0. gci_no_lmcs_in_loop_constraint_flag equal to "0" does not impose such a constraint.

Alternatively, the signaling of these parameters could be done at the system level rather than in an SEI message or in addition to syntax elements in the high-level syntax. Some of the benefit could be that some encoders do not support SEI messages, and that information that are used for an entire session, could be made readily available at a signaling/payload negotiation level.

For example these parameters could be signaled in:
  SDP (session description protocol), a format for describing multimedia communication sessions for the purposes of session announcement and session invitation, for example as described in RFCs and used in conjunction with RTP (Real-time Transport Protocol) transmission. For instance the following could be defined:
  a=fmtp:xxx profile-id=xxx; lmcs_inloop_flag=1;
  Color_Mapping_in_loop_flag=;
  DASH (Dynamic Adaptive Streaming over HTTP) MPD (Media Presentation Description) Descriptors. For example, as used in DASH and transmitted over HTTP, a Descriptor is associated to a Representation or collection of Representations to provide additional characteristic to a content Representation (the content is for example a video stream);

RTP header extensions, for example, as used during RTP streaming, specified in RFC 8285. For instance, the following could be defined:
a=extmap:xxx URI–lmcs_in_loop_flag
a=extmap:xxx URI–color_mapping_in_loop_flag
m=video
a=sendrecv;
or in the ISO Base Media File Format, for example as used in OMAF (Omnidirectional MediA Format) and using boxes which are object-oriented building blocks defined by a unique type identifier and length also known as 'atoms' in some specifications.

Figure 8:
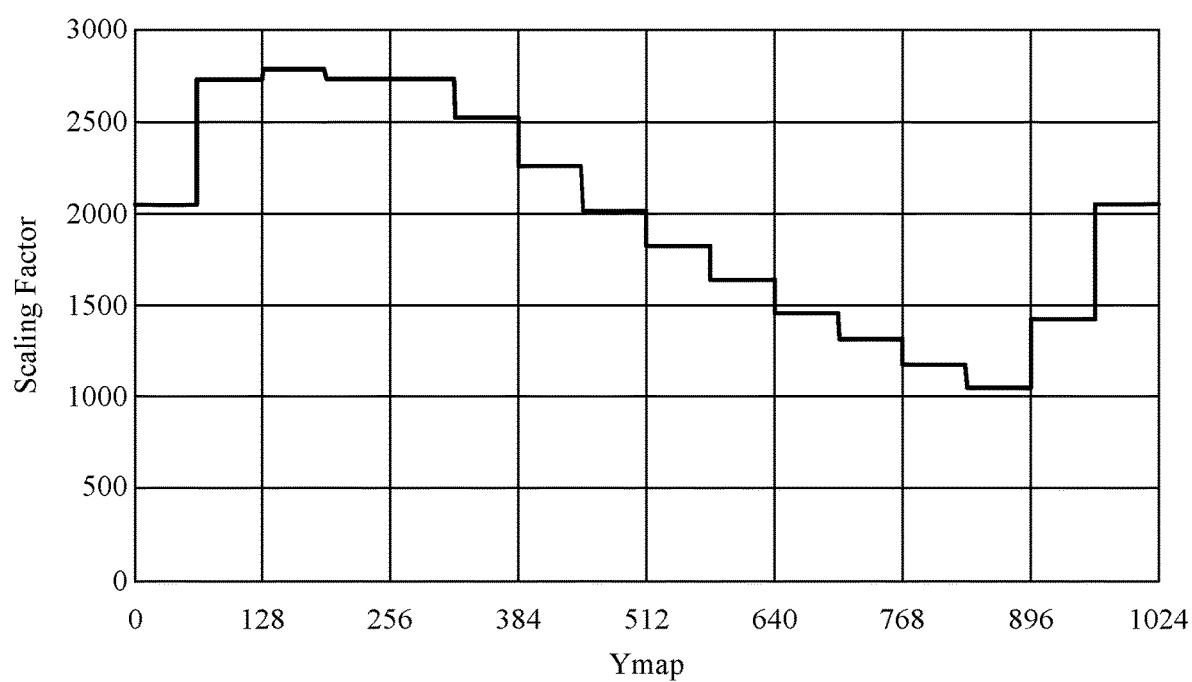
FIG. 8 illustrates a cross-component chroma scaling function.
Figure 9:
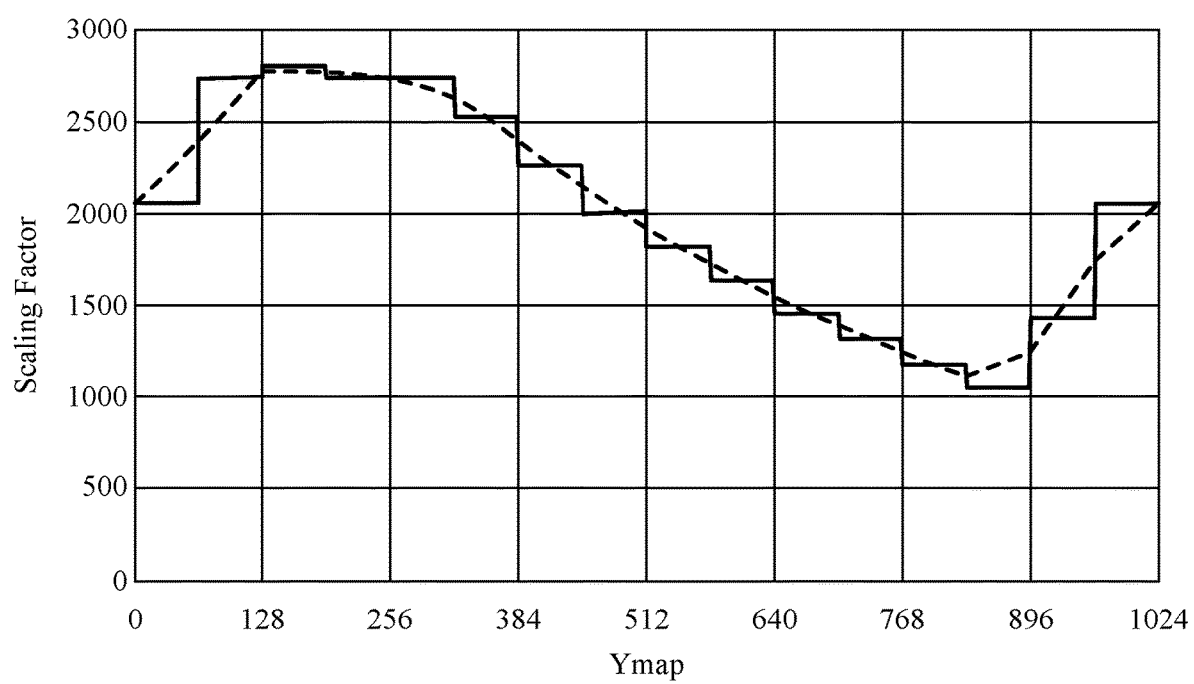
FIG. 9 illustrates an embodiment allowing improving an out of loop application of LMCS.

In a classical LMCS design, the cross-component chroma scaling function is defined as successive fixed values per intervals, which leads to a non-continuous function, as illustrated in the FIG. 8. When applied out-of-loop, these discontinuities may lead to coding efficiency losses. Indeed, a slight variation of the luma value may lead to strong differences in the chroma scaling values. Because the luma signal is subject to compression errors, these differences may frequently happen. An example of such discontinuous function is illustrated in FIG. 9, defined with the luma component Y in the mapped domain (noted Ymap in FIGS. 8 and 9).

Therefore, to avoid this drawback, it is proposed to use a smoothed or more continuous version of the chroma scaling function for the cross-component function. For instance, a piece-wise linear function defined from the chroma scaling values of the LMCS chroma scaling function can be used, as illustrated in the FIG. 9 in dashed line.

We have seen above a fourth embodiment wherein the first (or the second) embodiment and the third embodiment are combined. For example, in this fourth embodiment, LMCS in the prediction loop as in the first embodiment (or out of the prediction loop as in the second embodiment) is combined with a cross-color component transform defined in a CRI SEI message. For instance, the CRI is used to perform a cross-component transform with a static function per intra period, and LMCS is used to adjust or refine the transform per frame. This can advantageously provide coding gains compared to just using the CRI, or just using LMCS, or using none of them.

In a seventh embodiment, LMCS in-the-loop and the cross-component transform from a CRI SEI message are exclusive. The cross-component transform can only apply if LMCS is disabled.

In an eighth embodiment, LMCS in-the-loop and the cross-component transform from a CRI SEI message are not exclusive. This can advantageously be exploited to enable bitrate reduction and energy consumption control by the end-user. For instance, the input video is in HDR PQ format (BT.2020 PQ). It is mapped by an out-of-loop mapping, signaled in a SEI, to a video more similar to SDR. The mapped video is encoded and decoded, with a signaling in the VUI (Video Usability Information defined in document Rec. ITU-T H.274|ISO/IEC 23002-7) indicating that the coded video is SDR. LMCS in-the-loop can be used in complement to the out-of-loop mapping to achieve higher coding performance (with a mapping function, signaled in the APS, different from the out-of-loop mapping function). At the decoder, the compressed video is decoded. It can be displayed as is, that is, as an SDR-like video which may involve less energy consumption by the display since the picture brightness is lower than the HDR version. If the end-user wants to display the HDR version, it can apply the out-of-loop inverse mapping signaled in the SEI, that indicates that the target video is in HDR PQ format. The benefits are three folds:

1. Bitrate reduction: out-of-loop mapping provides better coding compression than in-loop LMCS for HDR PQ (as defined for example in recommendation BT.2100) video; also, LMCS can be applied on top of out-of-loop mapping, to the mapped video, to get additional coding gains. Indeed, LMCS is also beneficial for coding SDR video;
2. Energy consumption reduction in distribution: by gaining in compression and therefore bitrate, the energy consumption for distributing the video is reduced;
3. Energy consumption reduction in rendering: it is possible at rendering side, depending on the energy usage chosen by a client/end-user, to choose between the decoded mapped video as is, with lower brightness therefore lower display energy consumption, or the decoded mapped video processed by the out-of-loop inverse mapping, with higher brightness therefore higher display energy consumption.

In a variant of the modified CRI SEI message, pre_lut_coded_value[c][i] are not coded, but set to a default value dependent on the signal bit-depth and on the number of coded values (pre_lut_num_val_minus1[c]+1). For instance, pre_lut_coded_value[c][0] is set to "0", and pre_lut_coded_value[c][i+1]=pre_lut_coded_value[c][i]+preLutDelta where preLutDelta=$2^{bitdepth}$/(pre_lut_num_val_minus1[c]+1). In addition, instead of coding pre_lut_target_value[c][i] as an absolute value, it can be coded as a difference value relatively to prelut_target_value[c][i−1]. Applying this variant corresponds actually to a signalling similar to the LMCS APS signalling. Similarly, this can apply for the syntax associated to the transform post_lut. An example of corresponding syntax is provided in the table TAB10, which concatenates different variants of the modified CRI SEI message described in the present document. In addition, the SEI message is renamed Colour Transform Information SEI message, as it is a generalized version of the CRI SEI message.

TABLE TAB10

```
colour_transform_info( payloadSize ) {
    colour_transform_id
    colour_transform_in_loop_flag
    colour_transform_cancel_flag
    if( !colour_transform_cancel_flag ) {
        colour_transform_persistence_flag
        colour_transform_video_signal_info_present_flag
        if( colour_transform_video_signal_info_present_flag ) {
            colour_transform_full_range_flag
            colour_transform_primaries
            colour_transform_transfer function
            colour transform_matrix coefficients
        }
```

TABLE TAB10-continued

```
colour_transform_input_bit_depth
colour_transform_output_bit_depth
colour_transform_pre_lut_cross_component_flag
if (colour_transform_pre_lut_cross_component_flag) {
    colour_transform_pre_lut_cross_comp_mode
    colour_transform_pre_lut_cross_component_inferred_flag
    if (colour_transform_pre_lut_cross_component_inferred_flag = = 0)
        colour_transform_pre_lut_number_minus1
}
for( c = 0; c < colourTransformPreLutNumber; c++ ) {
    pre_lut_num_val_minus1[ c ]
    if( pre_lut_num_val_minus1[ c ] > 0 )
        for( i= 0; i <= pre_lut_num_val_minus1[ c ]; i++ )
            pre_lut_delta_value[ c ][ i ]
}
colour_transform_matrix present_flag
if( colour_transform_matrix_present_flag ) {
    log2_matrix_denom
    for( c = 0; c < 3; c++ )
        for( i = 0; i < 3; i++ )
            colour_transform_coeffs[ c ][ i ]
}
colour_transform_post_lut_cross_component_flag
if (colour_transform _post_lut_cross_component_flag) {
    colour_transform_post_lut_cross_comp_mode
    colour_transform_post_lut_cross_component_inferred_flag
    if (colour_transform_post_lut_cross_component_inferred_flag = = 0)
        colour_transform_post_lut_number_minus1
}
for( c = 0; c < 3; c++ ) {
    post_lut_num_val minus1[ c ]
    if( post_lut_num_val_minus1[ c ] > 0 )
        for( i = 0; i <= post_lut_num_val_minus1[ c ]; i++ )
            post_lut_delta_value[ c ][ i ]
    }
  }
}
```

A variable colourTransformPreLutNumber is equal to "3" when colour_transform_pre_lut_cross_component_flag is equal to "0" ("3" transforms pre_lut are signalled for components c=0 to 2). When colour_transform_pre_lut_cross_component_flag is equal to "1", colourTransformPreLutNumber is equal to "1" when colour_transform_pre_lut_cross_component_inferred_flag is equal to "1" ("1" single transform pre_lut is signalled for component c=0, and the transforms pre_lut for components c=1 and "2" are inferred from this single signalled transform pre_lut), or to (2+colour_transform_pre_lut_number_minus1) when colour_transform_pre_lut_cross_component_inferred_flag is equal to "0" ("1" transform pre_lut is signalled for component c=0, and (colour_transform_pre_lut_number_minus1+1) transform pre_lut for components c=1 and "2"). The same applies for the transforms post_lut by replacing "pred" by "post".

The fifth, sixth and seventh embodiments were described mainly in relation to a decoding module and the method of decoding of FIG. 3. It is however obvious that all syntax elements described in relation to the fifth, sixth and seventh embodiments (i.e. the modified CRI SEI message and the modified APS of type LMCS_APS) obtained by the decoding module with the encoded video stream 211 were associated to the encoded video stream 211 by the encoding module.

FIG. 4A illustrates schematically an example of hardware architecture of a processing module 40 able to implement an encoding module or a decoding module capable of implementing respectively a method for encoding of FIG. 2 and a method for decoding of FIG. 3 modified according to different aspects and embodiments described above. The processing module 40 comprises, connected by a communication bus 405: a processor or CPU (central processing unit) 400 encompassing one or more microprocessors, general purpose computers, special purpose computers, and processors based on a multi-core architecture, as non-limiting examples; a random access memory (RAM) 401; a read only memory (ROM) 402; a storage unit 403, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive, or a storage medium reader, such as a SD (secure digital) card reader and/or a hard disc drive (HDD) and/or a network accessible storage device; at least one communication interface 404 for exchanging data with other modules, devices or equipment. The communication interface 404 can include, but is not limited to, a transceiver configured to transmit and to receive data over communication channel. The communication interface 404 can include, but is not limited to, a modem or network card.

If the processing module 40 implements a decoding module, the communication interface 404 enables for instance the processing module 40 to receive encoded video streams and to provide a decoded video stream. If the processing module 40 implements an encoding module, the communication interface 404 enables for instance the processing module 40 to receive original image data to encode and to provide an encoded video stream.

The processor 400 is capable of executing instructions loaded into the RAM 401 from the ROM 402, from an external memory (not shown), from a storage medium, or from a communication network. When the processing module 40 is powered up, the processor 400 is capable of reading instructions from the RAM 401 and executing them. These instructions form a computer program causing, for example, the implementation by the processor 400 of a decoding method as described in relation with FIG. 3 or an encoding method described in relation to FIG. 2, the decoding and encoding methods comprising various aspects and embodiments described above.

All or some of the algorithms and steps of said encoding or decoding methods may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit).

FIG. 4B illustrates a block diagram of an example of a system 4 in which various aspects and embodiments are implemented. System 4 can be embodied as a device including the various components described below and is configured to perform one or more of the aspects and embodiments described in this document. Examples of such devices include, but are not limited to, various electronic devices such as personal computers, laptop computers, smartphones, tablet computers, digital multimedia set top boxes, digital television receivers, personal video recording systems, connected home appliances, cameras, and servers. Elements of system 4, singly or in combination, can be embodied in a single integrated circuit (IC), multiple ICs, and/or discrete components. For example, in at least one embodiment, the system 4 comprises one processing module 40 that implement a decoding module or an encoding module. But, in another embodiment, the system 4 can comprise a first processing module 40 implementing a decoding module and a second processing module 40 implementing an encoding module or one processing module 40 implementing a decoding module and an encoding module. In various embodiments, the system 40 is communicatively coupled to one or more other systems, or other electronic devices, via, for example, a communications bus or through dedicated input and/or output ports. In various embodiments, the system 4 is configured to implement one or more of the aspects described in this document.

The system 4 comprises at least one processing module 40 capable of implementing one of an encoding module or a decoding module or both.

The input to the processing module 40 can be provided through various input modules as indicated in block 42. Such input modules include, but are not limited to, (i) a radio frequency (RF) module that receives an RF signal transmitted, for example, over the air by a broadcaster, (ii) a component (COMP) input module (or a set of COMP input modules), (iii) a Universal Serial Bus (USB) input module, and/or (iv) a High Definition Multimedia Interface (HDMI) input module. Other examples, not shown in FIG. 4B, include composite video.

In various embodiments, the input modules of block 42 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF module and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Additionally, the USB and/or HDMI modules can include respective interface processors for connecting system 4 to other electronic devices across USB and/or HDMI connections. It is to be understood that various aspects of input processing, for example, Reed-Solomon error correction, can be implemented, for example, within a separate input processing IC or within the processing module 40 as necessary. Similarly, aspects of USB or HDMI interface processing can be implemented within separate interface ICs or within the processing module 40 as necessary. The demodulated, error corrected, and demultiplexed stream is provided to the processing module 40.

Various elements of system 4 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system 4, the processing module 40 is interconnected to other elements of said system 4 by the bus 405.

The communication interface 404 of the processing module 40 allows the system 4 to communicate on a communication channel 41. The communication channel 41 can be implemented, for example, within a wired and/or a wireless medium.

Data is streamed, or otherwise provided, to the system 4, in various embodiments, using a wireless network such as a Wi-Fi network, for example IEEE 802.11 (IEEE refers to the Institute of Electrical and Electronics Engineers). The Wi-Fi signal of these embodiments is received over the communications channel 41 and the communications interface 404 which are adapted for Wi-Fi communications. The communications channel 41 of these embodiments is typically connected to an access point or router that provides access to external networks including the Internet for allowing streaming applications and other over-the-top communications. Other embodiments provide streamed data to the system 4 using a set-top box that delivers the data over the HDMI connection of the input block 42. Still other embodiments provide streamed data to the system 4 using the RF connection of the input block 42. As indicated above, various embodiments provide data in a non-streaming manner. Additionally, various embodiments use wireless networks other than Wi-Fi, for example a cellular network or a Bluetooth network.

The system 4 can provide an output signal to various output devices, including a display 46, speakers 47, and other peripheral devices 48. The display 46 of various embodiments includes one or more of, for example, a touchscreen display, an organic light-emitting diode (OLED) display, a curved display, and/or a foldable display. The display 46 can be for a television, a tablet, a laptop, a cell phone (mobile phone), or other devices. The display 46 can also be integrated with other components (for example, as in a smart phone), or separate (for example, an external monitor for a laptop). The other peripheral devices 46 include, in various examples of embodiments, one or more of a stand-alone digital video disc (or digital versatile disc) (DVR, for both terms), a disk player, a stereo system, and/or a lighting system. Various embodiments use one or more peripheral devices 48 that provide a function based on the output of the system 4. For example, a disk player performs the function of playing the output of the system 4.

In various embodiments, control signals are communicated between the system 4 and the display 46, speakers 47, or other peripheral devices 48 using signaling such as AV.Link, Consumer Electronics Control (CEC), or other communications protocols that enable device-to-device control with or without user intervention. The output devices can be communicatively coupled to system 4 via dedicated connections through respective interfaces 43, 44, and 45. Alternatively, the output devices can be connected to system 4 using the communications channel 41 via the communications interface 404. The display 46 and speakers 47 can be integrated in a single unit with the other components of system 4 in an electronic device such as, for example, a television. In various embodiments, the display interface 43 includes a display driver, such as, for example, a timing controller (T Con) chip.

The display 46 and speaker 47 can alternatively be separate from one or more of the other components, for example, if the RF module of input 42 is part of a separate set-top box. In various embodiments in which the display 46 and speakers 47 are external components, the output signal can be provided via dedicated output connections, including, for example, HDMI ports, USB ports, or COMP outputs.

Various implementations involve decoding. "Decoding", as used in this application, can encompass all or part of the processes performed, for example, on a received encoded video stream in order to produce a final output suitable for display. In various embodiments, such processes include one or more of the processes typically performed by a decoder, for example, entropy decoding, inverse quantization, inverse transformation, and prediction. In various embodiments, such processes also, or alternatively, include processes performed by a decoder of various implementations or embodiments described in this application, for example, for applying an in-loop or out-of-loop cross-color component transform process, LMCCS process or a LMCS process.

Whether the phrase "decoding process" is intended to refer specifically to a subset of operations or generally to the broader decoding process is clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded video stream. In various embodiments, such processes include one or more of the processes typically performed by an encoder, for example, partitioning, prediction, transformation, quantization, in-loop post-filtering and entropy encoding. In various embodiments, such processes also, or alternatively, include processes performed by an encoder of various implementations or embodiments described in this application, for example, for applying an in-loop or out-of-loop cross-color component transform process, LMCCS process or a LMCS process.

Whether the phrase "encoding process" is intended to refer specifically to a subset of operations or generally to the broader encoding process is clear based on the context of the specific descriptions and is believed to be well understood by those skilled in the art.

Note that the syntax elements names, flags names, containers names, coding tools names as used herein, are descriptive terms. As such, they do not preclude the use of other syntax element, flags, containers, or coding tools names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between a rate and a distortion is usually considered. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of a reconstructed signal after coding and decoding. Faster approaches may also be used, to save encoding complexity, in particular with computation of an approximated distortion based on a prediction or a prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, inferring the information from other information(s), retrieving the information from memory or obtaining the information for example from another device, module or from user.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, inferring the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, inferring the information, or estimating the information.

It is to be appreciated that the use of any of the following "/", "and/or", and "at least one of", "one or more of" for example, in the cases of "A/B", "A and/or B" and "at least one of A and B", "one or more of A and B" is intended to encompass the selection of the first listed option (A) only, or the selection of the second listed option (B) only, or the selection of both options (A and B). As a further example, in the cases of "A, B, and/or C" and "at least one of A, B, and C", "one or more of A, B and C" such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals information related to cross-colors component transform, LMCCS or LMCS in APS or SEI messages. In this way, in an embodiment the same parameters are used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the encoded video stream of a described embodiment. Such a signal can be formatted, for example, as an electromagnetic wave (for example, using a radio frequency portion of spectrum) or as a baseband signal. The formatting can include, for example, encoding an encoded video stream and modulating a carrier with the encoded video stream. The information that the signal carries can be, for example, analog or digital information. The signal can be transmitted over a variety of different wired or wireless links, as is known. The signal can be stored on a processor-readable medium.

Further, embodiments can include one or more of the following features, devices, or aspects, alone or in any combination, across various claim categories and types:

- A bitstream or signal that includes syntax elements conveying information generated according to any of the embodiments described;
- Inserting in the signaling syntax elements that enable the decoder to adapt the decoding process in a manner corresponding to that used by an encoder;
- Creating and/or transmitting and/or receiving and/or decoding a bitstream or signal that includes one or more of the described syntax elements, or variations thereof;
- Creating and/or transmitting and/or receiving and/or decoding according to any of the embodiments described;
- A method, process, apparatus, medium storing instructions, medium storing data, or signal according to any of the embodiments described;
- A TV, set-top box, cell phone, tablet, or other electronic device that performs adaptation of the encoding or decoding process according to any of the embodiments described;
- A TV, set-top box, cell phone, tablet, or other electronic device that performs adaptation of encoding or decoding process according to any of the embodiments described, and that displays (e.g. using a monitor, screen, or other type of display) a resulting image;
- A TV, set-top box, cell phone, tablet, or other electronic device that selects (e.g. using a tuner) a channel to receive a signal including an encoded image, and performs adaptation of the decoding process according to any of the embodiments described;
- A TV, set-top box, cell phone, tablet, or other electronic device that receives (e.g. using an antenna) a signal over the air that includes an encoded image, and performs adaptation of the encoding process according to any of the embodiments described.

The invention claimed is:

1. A method comprising:
obtaining an information set associated with video data, each sample of each picture represented by the video data being represented by a plurality of color components, wherein said information set comprises a syntax element indicating with a first value that a first transform mapping values of a first color component from a first dynamic range to a second dynamic range is explicitly signaled in the information set and, with a second value, that the first transform is inferred from a second transform signaled in the information set mapping values of a second color component from a third dynamic range to a fourth dynamic range; and,
decoding the video data based on the syntax element.

2. The method of claim 1 wherein, the first color component is a chroma component and the second color component is a luma component.

3. The method according to claim 1 wherein the first transform is a cross component transform mapping values of the first color component from the first dynamic range to the second dynamic range based on the second color component.

4. The method of claim 1 wherein, responsive to the syntax element having the second value, the first transform is derived from information representative of a slope of the second transform.

5. The method of claim 1 wherein the first color component is a first chroma component and the second color component is a second chroma component.

6. The method of claim 1 wherein, responsive to the syntax element having the second value, the first transform is derived from the second transform by adding difference values signaled in the information set for the first transform to information representing the second transform signaled in the information set.

7. A method comprising:
signaling an information set associated with video data, each sample of each picture represented by the video data being represented by a plurality of color components, wherein said information set comprises a syntax element indicating with a first value that a first transform mapping values of a first color component from a first dynamic range to a second dynamic range is explicitly signaled in the information set and, with a second value, that the first transform is inferred from a second transform signaled in the information set mapping values of a second color component from a third dynamic range to a fourth dynamic range.

8. The method of claim 7 wherein, the first color component is a chroma component and the second color component is a luma component.

9. The method according to claim 7 wherein the first transform is a cross component transform mapping values of the first color component from the first dynamic range to the second dynamic range based on the second color component.

10. The method of claim 7 wherein, responsive to the syntax element having the second value, the first transform is derived from information representative of a slope of the second transform.

11. The method of claim 7 wherein the first color component is a first chroma component and the second color component is a second chroma component.

12. The method of claim 7 wherein, responsive to the syntax element having the second value, the first transform is derived from the second transform by adding difference values signaled in the information set for the first transform to information representing the second transform signaled in the information set.

13. A device comprising electronic circuitry configured for:
obtaining an information set associated with video data, each sample of each picture represented by the video data being represented by a plurality of color components, wherein said information set comprises a syntax element indicating with a first value that a first transform mapping values of a first color component from a first dynamic range to a second dynamic range is explicitly signaled in the information set and, with a second value, that the first transform is inferred from a second transform signaled in the information set mapping values of a second color component from a third dynamic range to a fourth dynamic range; and,
decoding the video data based on the syntax element.

14. The device of claim 13 wherein, the first color component is a chroma component and the second color component is a luma component.

15. The device according to claim 13 wherein the first transform is a cross component transform mapping values of the first color component from the first dynamic range to the second dynamic range based on the second color component.

16. The device of claim 13 wherein, responsive to the syntax element having the second value, the first transform is derived from information representative of a slope of the second transform.

17. The device of claim 13 wherein the first color component is a first chroma component and the second color component is a second chroma component.

18. The device of claim 13 wherein, responsive to the syntax element having the second value, the first transform is derived from the second transform by adding difference values signaled in the information set for the first transform to information representing the second transform signaled in the information set.

19. A device comprising electronic circuitry configured for:
signaling an information set associated with video data, each sample of each picture represented by the video data being represented by a plurality of color components, wherein said information set comprises a syntax element indicating with a first value that a first transform mapping values of a first color component from a first dynamic range to a second dynamic range is explicitly signaled in the information set and, with a second value, that the first transform is inferred from a second transform signaled in the information set mapping values of a second color component from a third dynamic range to a fourth dynamic range.

20. The device of claim 19 wherein, the first color component is a chroma component and the second color component is a luma component.

* * * * *